United States Patent [19]

Brandt et al.

[11] Patent Number: 4,695,950

[45] Date of Patent: Sep. 22, 1987

[54] FAST TWO-LEVEL DYNAMIC ADDRESS TRANSLATION METHOD AND MEANS

[75] Inventors: Henry R. Brandt; Patrick M. Gannon, both of Poughkeepsie, N.Y.; Wan L. Leung, Coral Springs, Fla.; Timothy R. Marchini, Wappingers Falls, N.Y.

[73] Assignee: International Business Machines Corporation, Armonk, N.Y.

[21] Appl. No.: 651,491

[22] Filed: Sep. 17, 1984

[51] Int. Cl.[4] ............................................. G06F 12/10
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 4,241,401 | 12/1980 | De Ward et al. | 364/200 |
| 4,253,145 | 2/1981 | Goldberg | 364/200 |
| 4,279,014 | 7/1981 | Cassonnet et al. | 364/200 |
| 4,285,040 | 8/1981 | Carlson et al. | 364/200 |
| 4,347,565 | 8/1982 | Kaneda et al. | 364/200 |
| 4,400,769 | 8/1983 | Kaneda et al. | 364/200 |
| 4,456,954 | 6/1984 | Bullions, III et al. | 364/200 |
| 4,495,575 | 1/1985 | Eguchi | 364/200 |

Primary Examiner—Archie E. Williams, Jr.
Assistant Examiner—Michael J. Ure
Attorney, Agent, or Firm—Bernard M. Goldman

[57] ABSTRACT

A unique high-speed hardware arrangement for generating double-level address translations in combination a translation look-aside buffer (TLB) structure that can store and lookup intermediate translations during a double-level translation. The hardware proceeds to the completion of a double-level translation without having to backup its operation, although an intermediate TLB miss is encountered, without danger of CPU deadlock occurring. The hardware arrangement also performs all single-level address translations required by the system.

10 Claims, 29 Drawing Figures

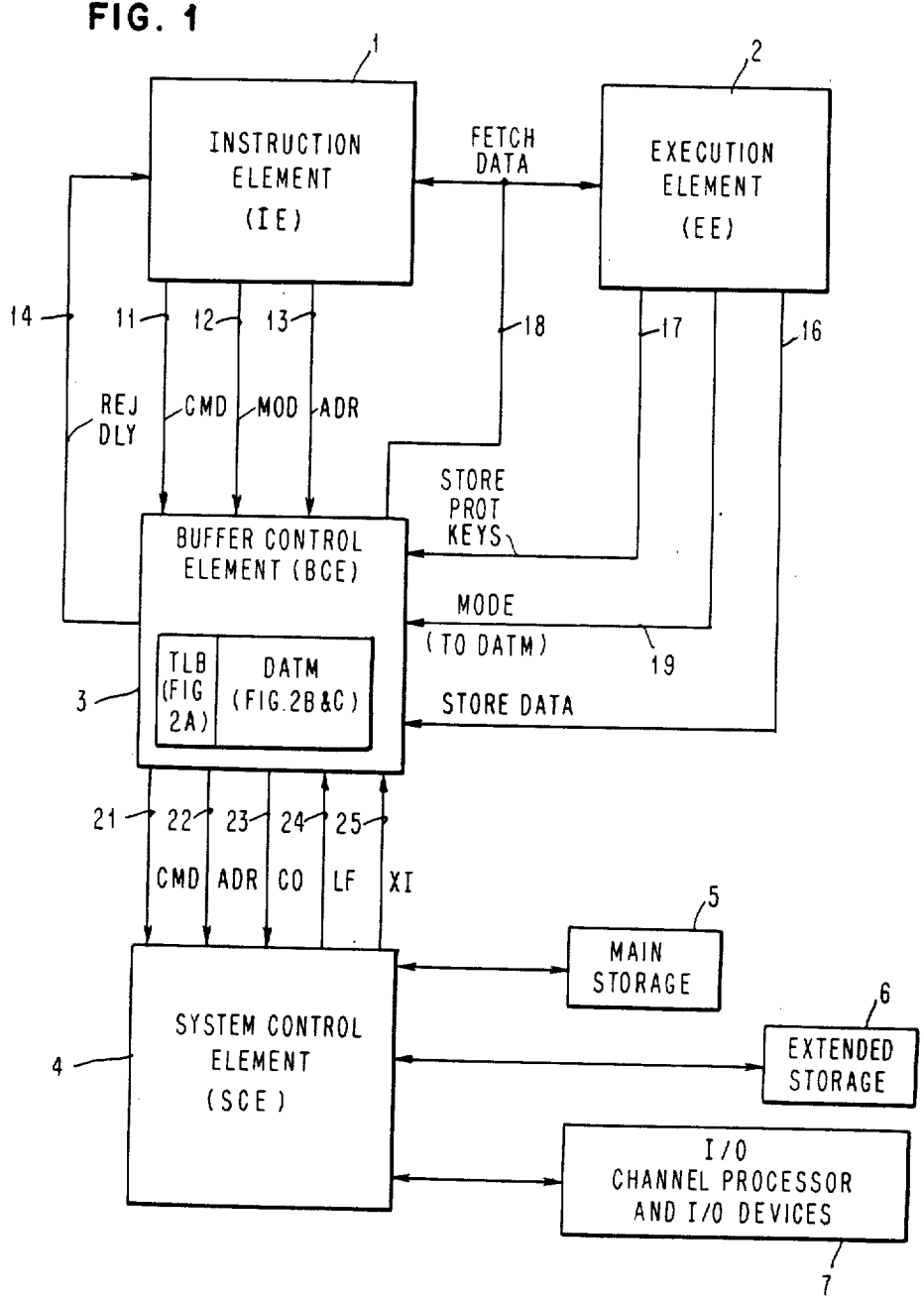

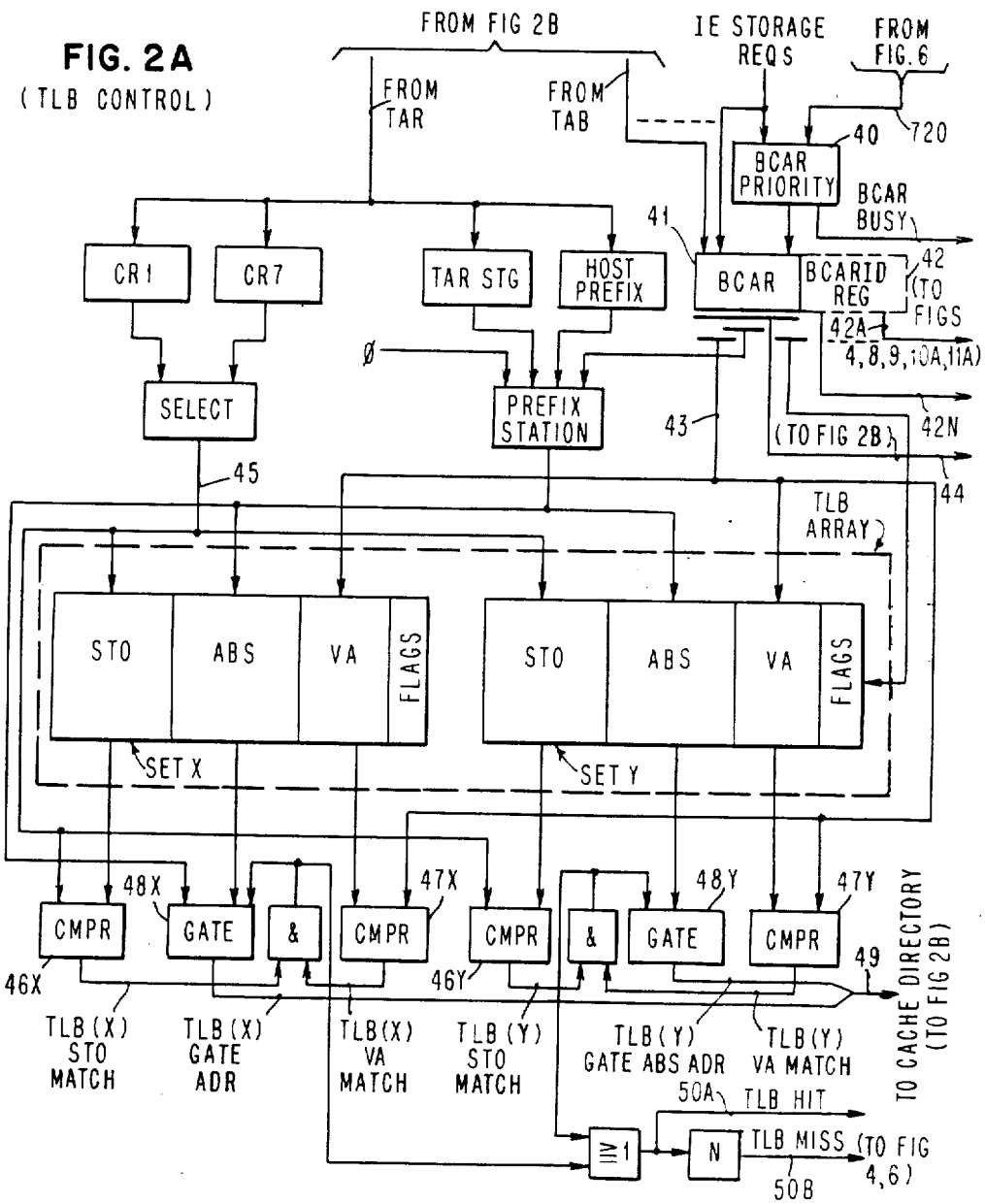

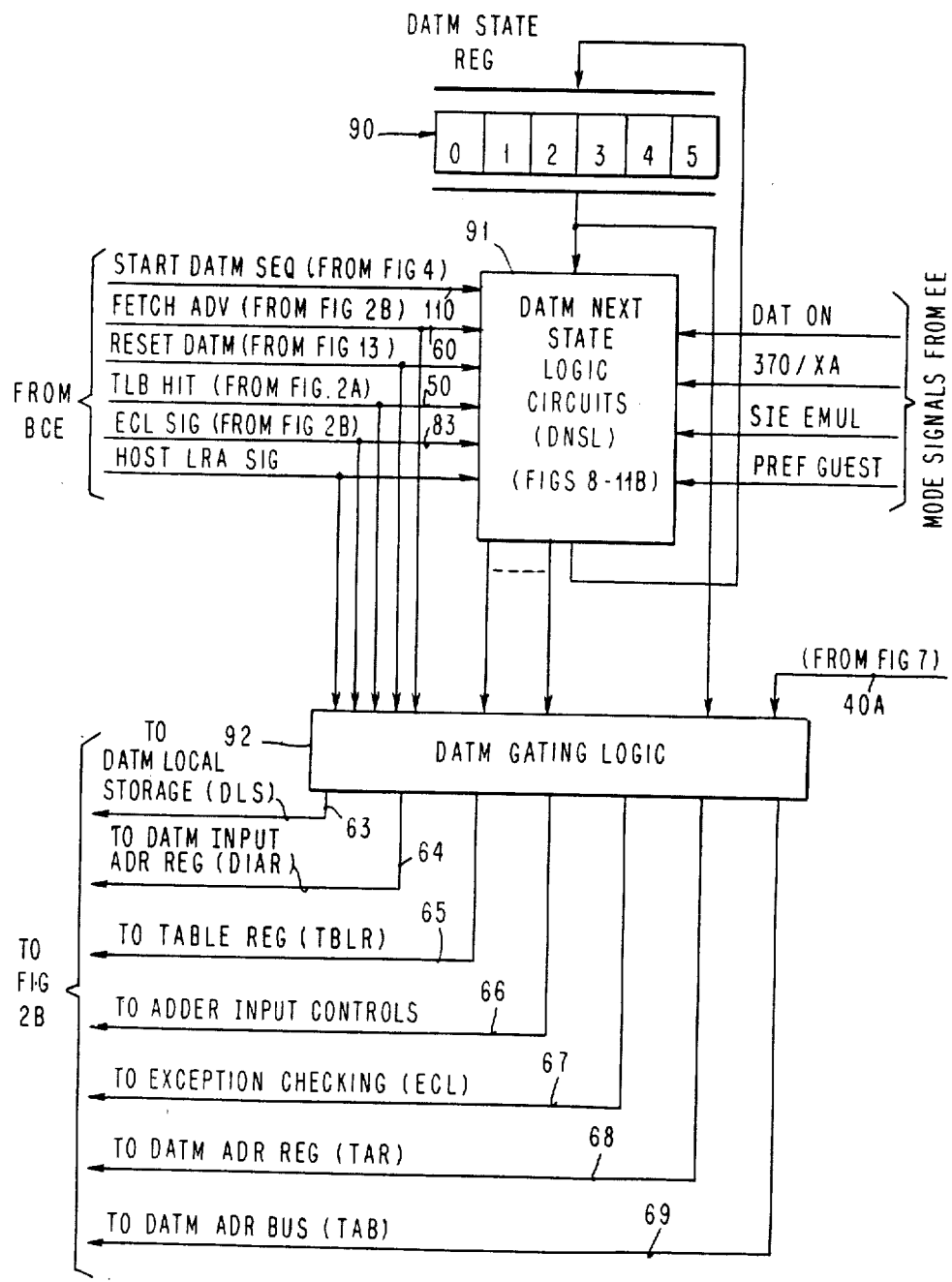

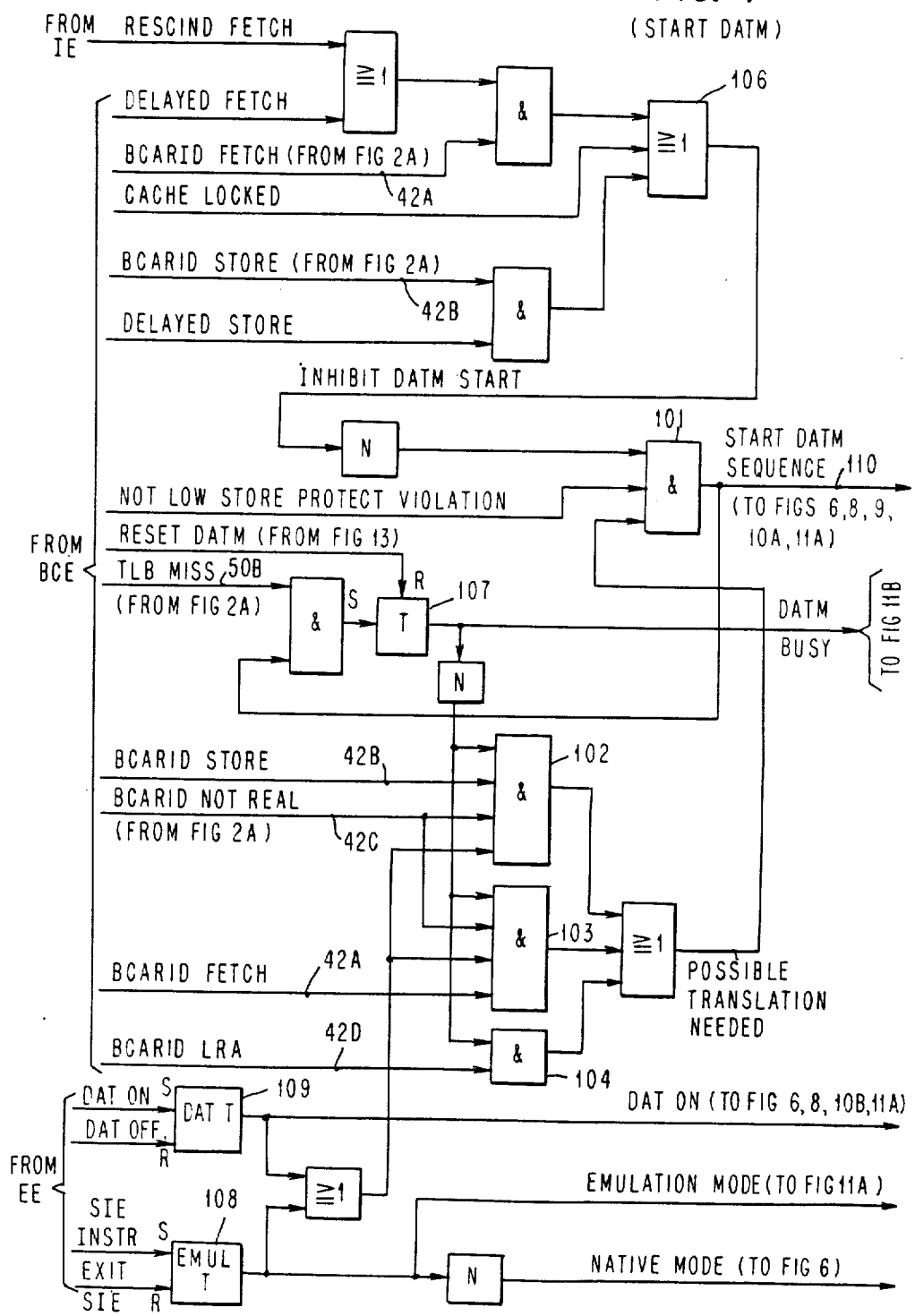

FIG. 5
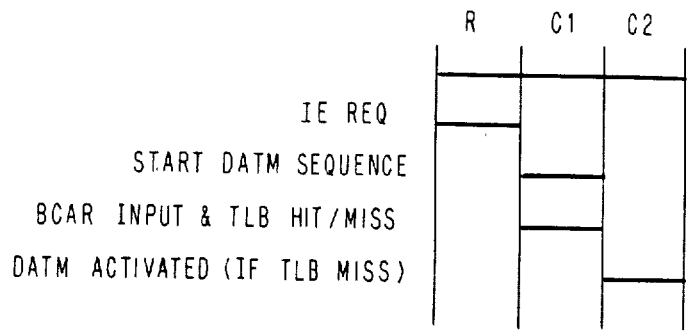
FIG. 6  (DATM REQ BCAR PRIORITY)
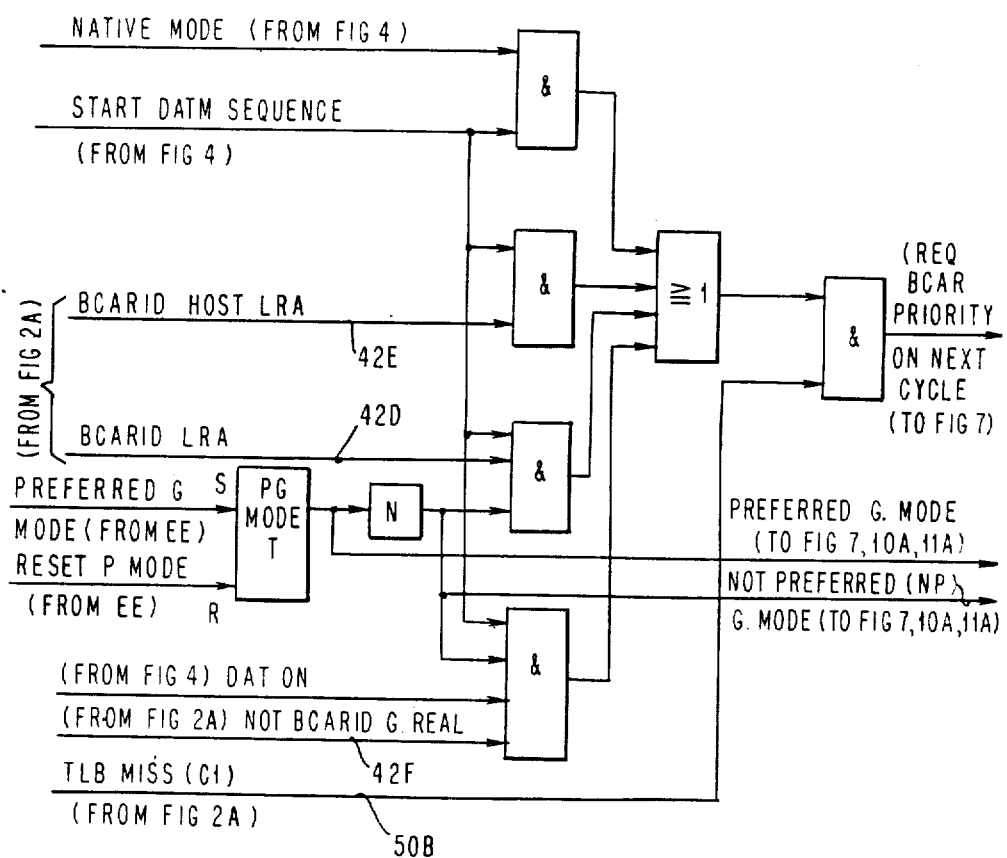

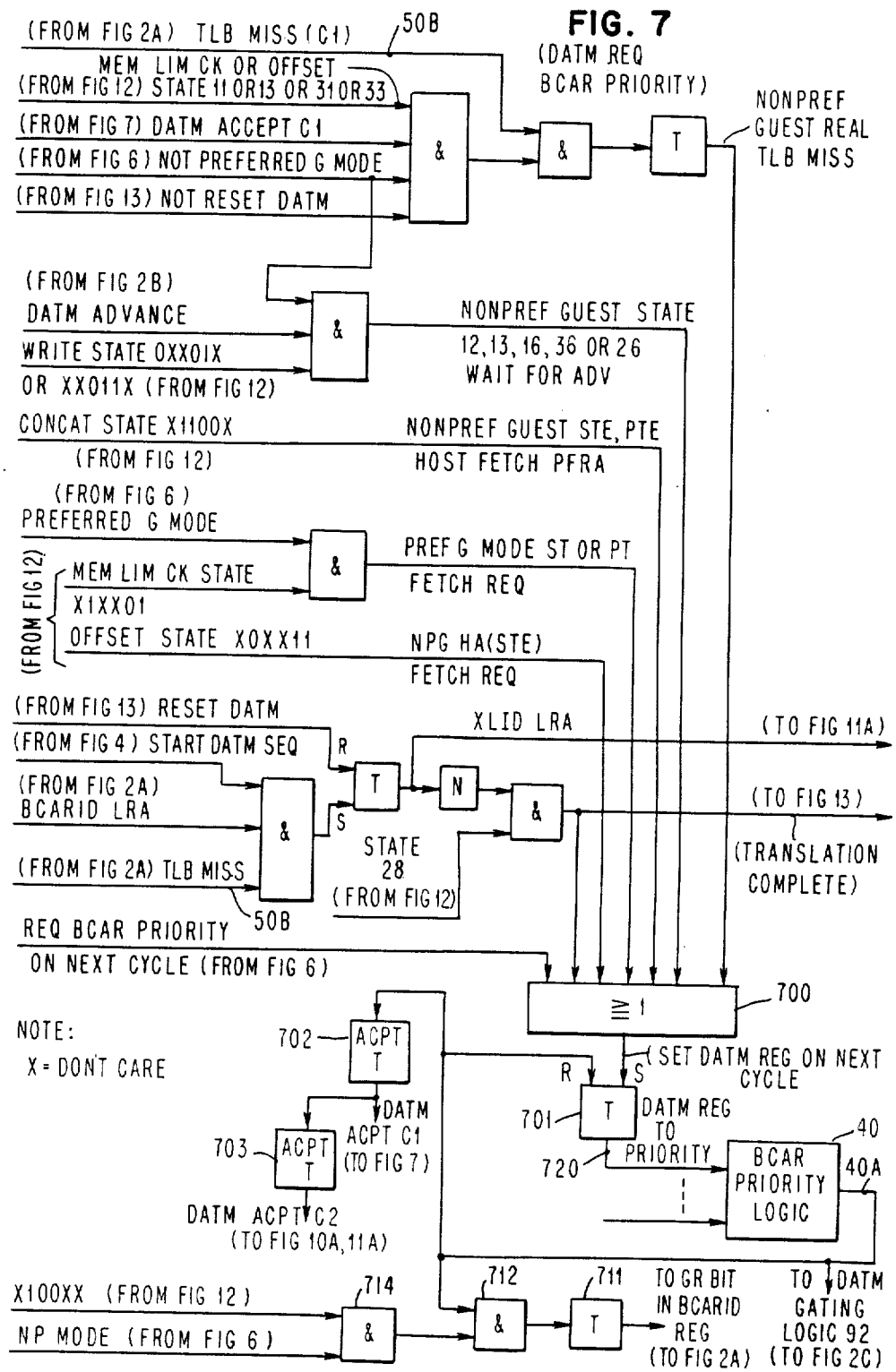

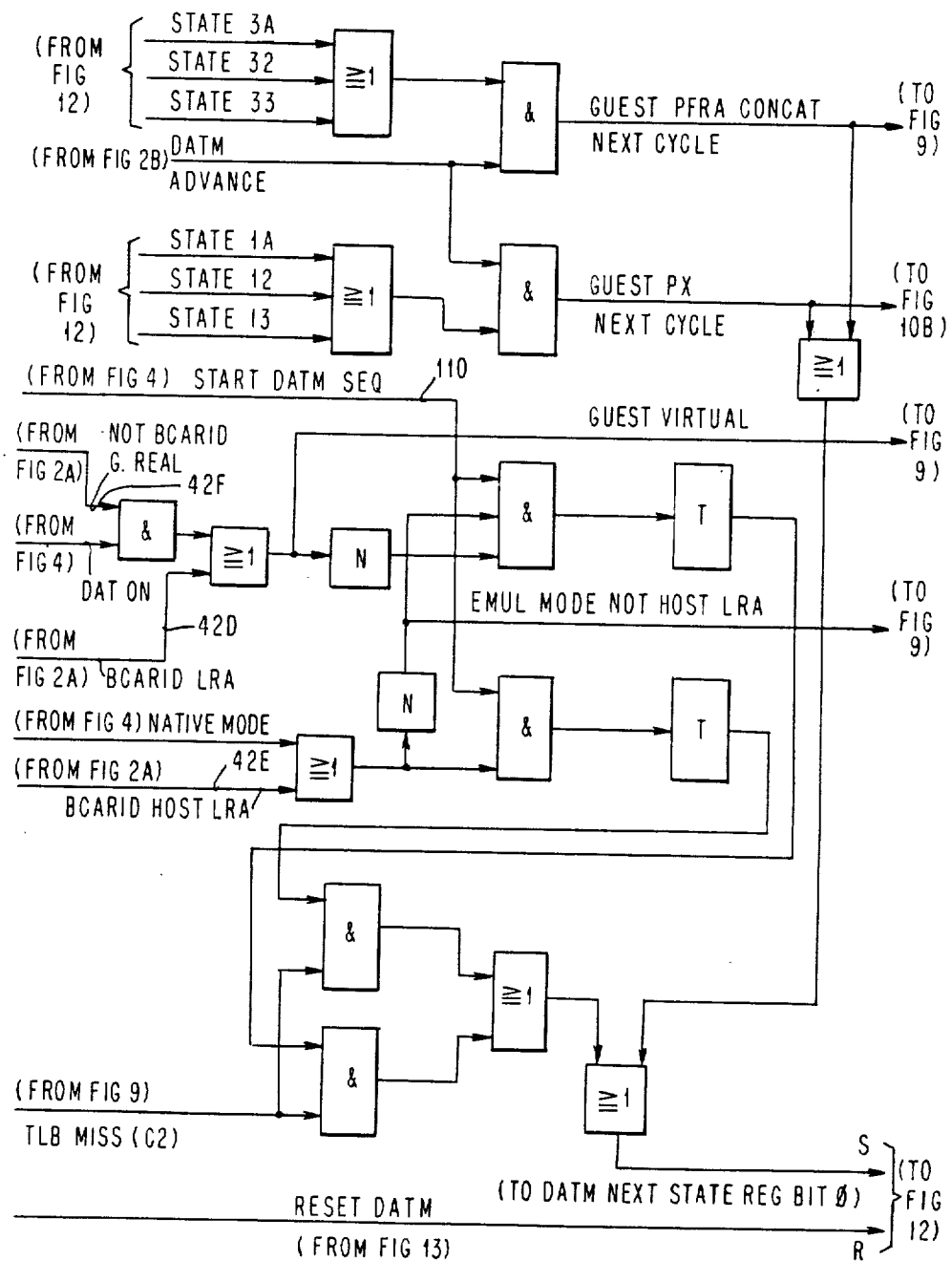
FIG. 8 (DATM STATE REG BIT Ø IN NEXT STATE LOGIC)

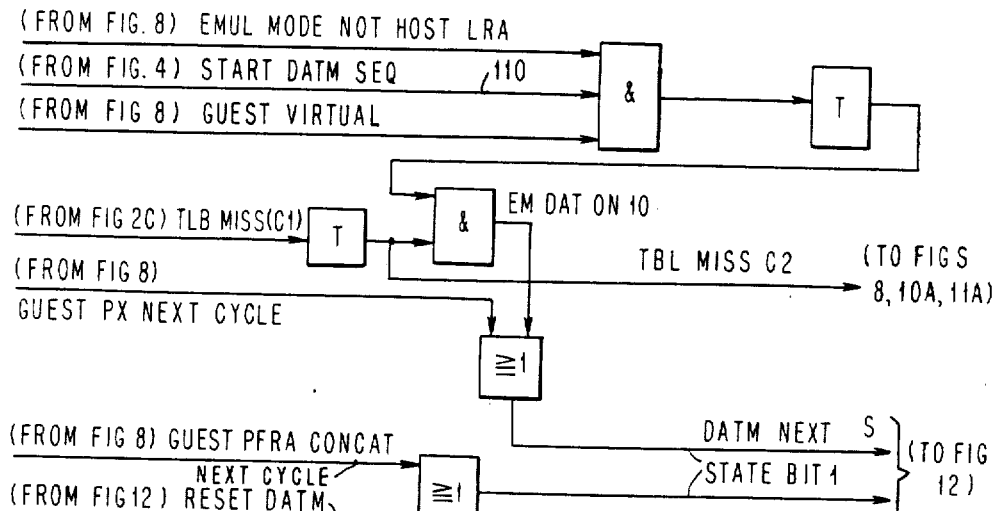
FIG. 9 (DATM STATE BIT 1)
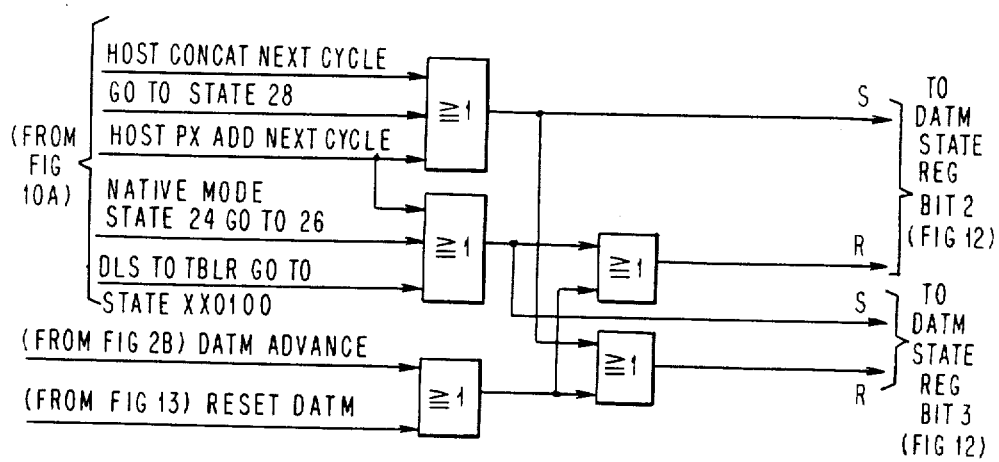
FIG. 10B (DATM STATE BITS 2 & 3)

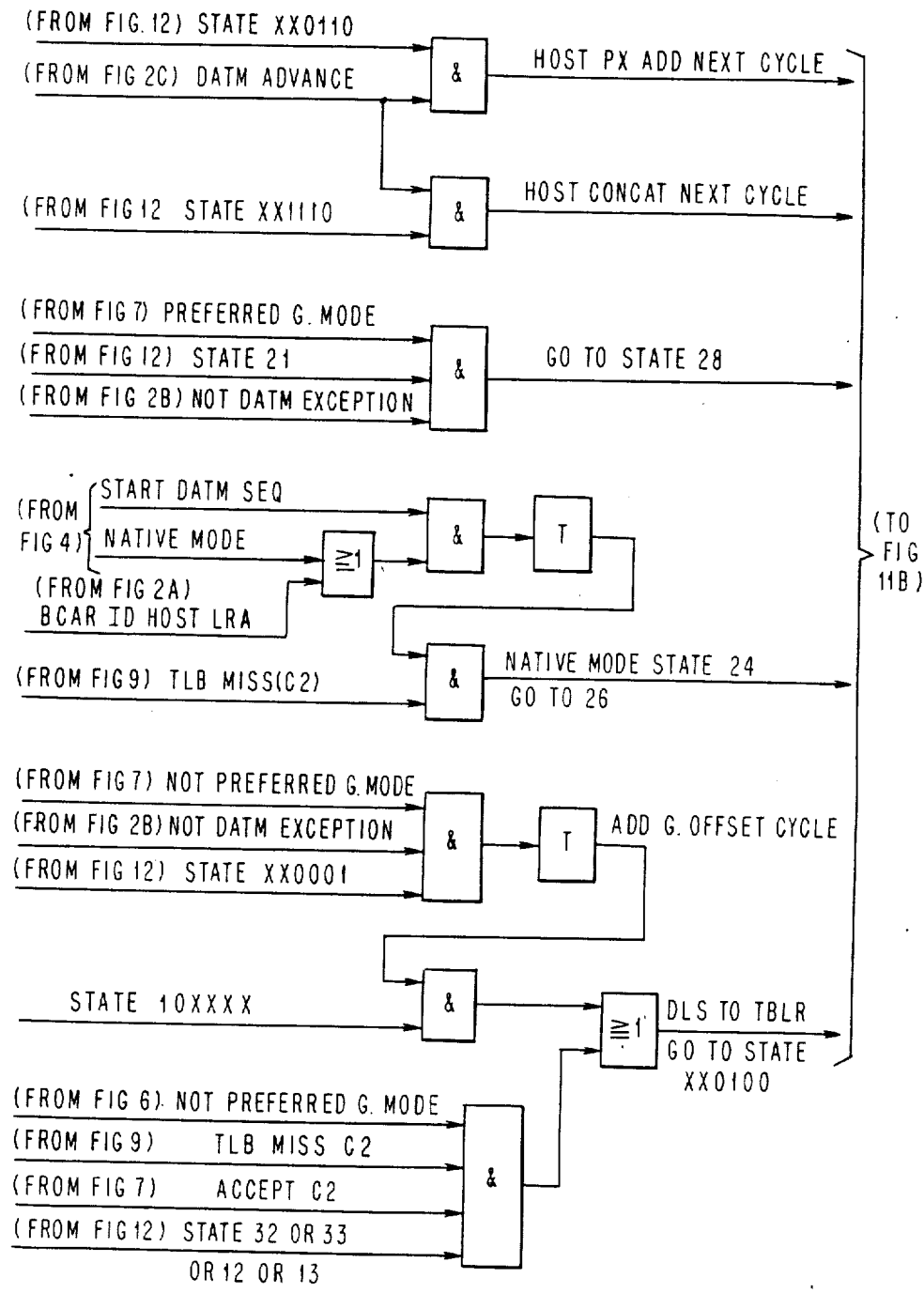
FIG. 10A (DATM STATE REG SET SIGNALS)

(DATM STATE REG BITS 4,5 SET SIGNALS)

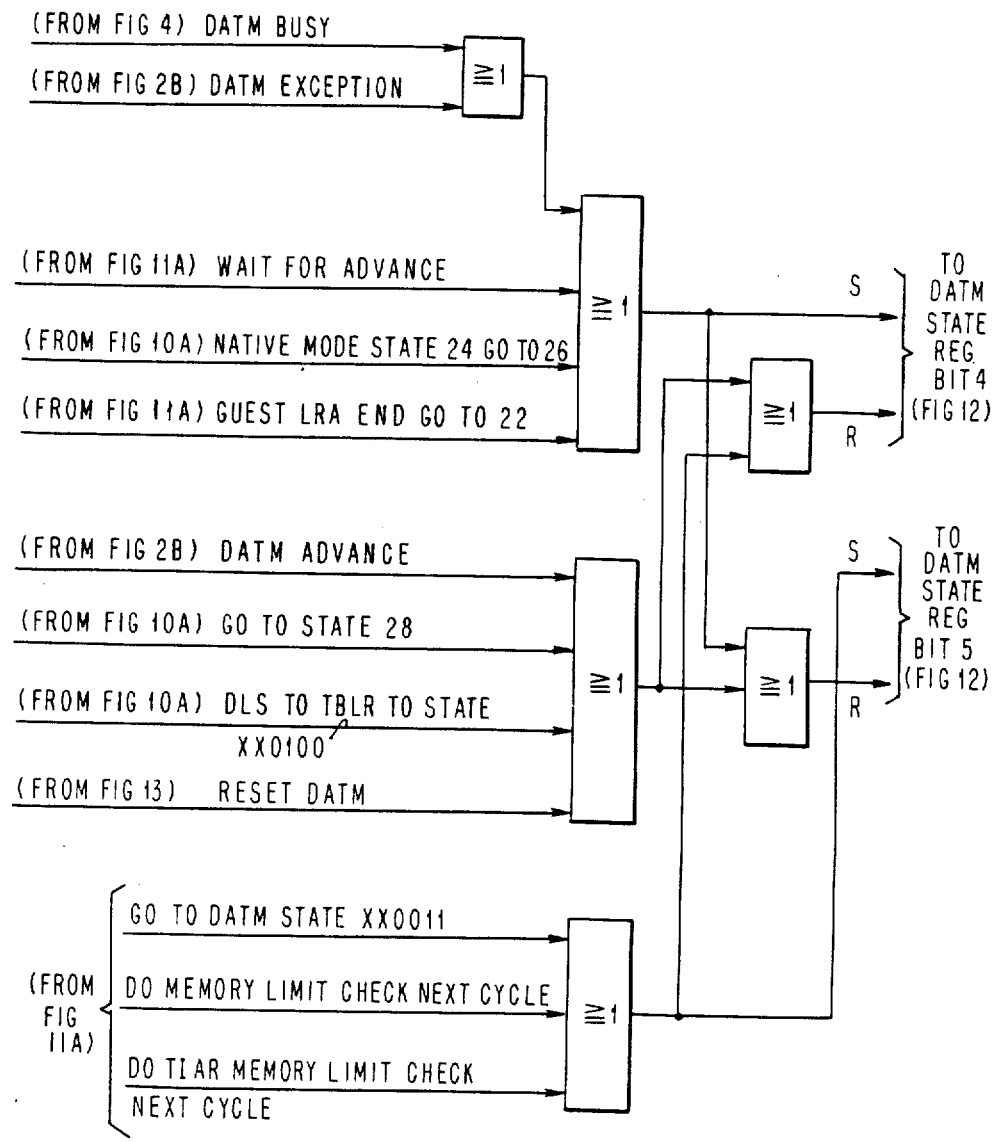
FIG. 11B  (SET DATM STATE REG BITS 4,5)

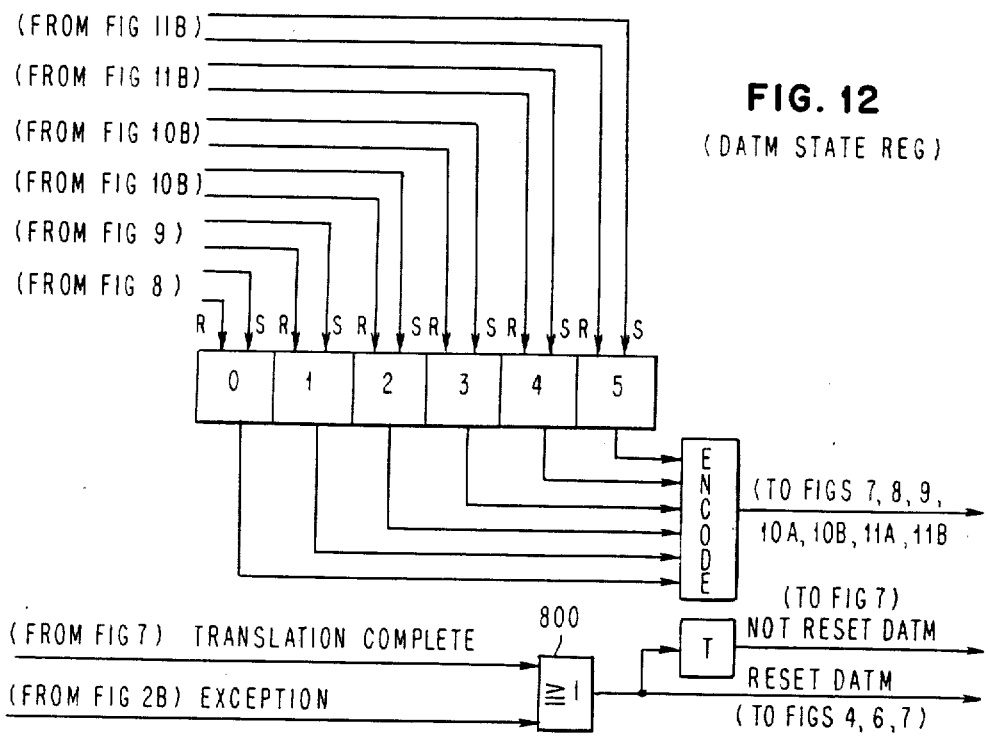
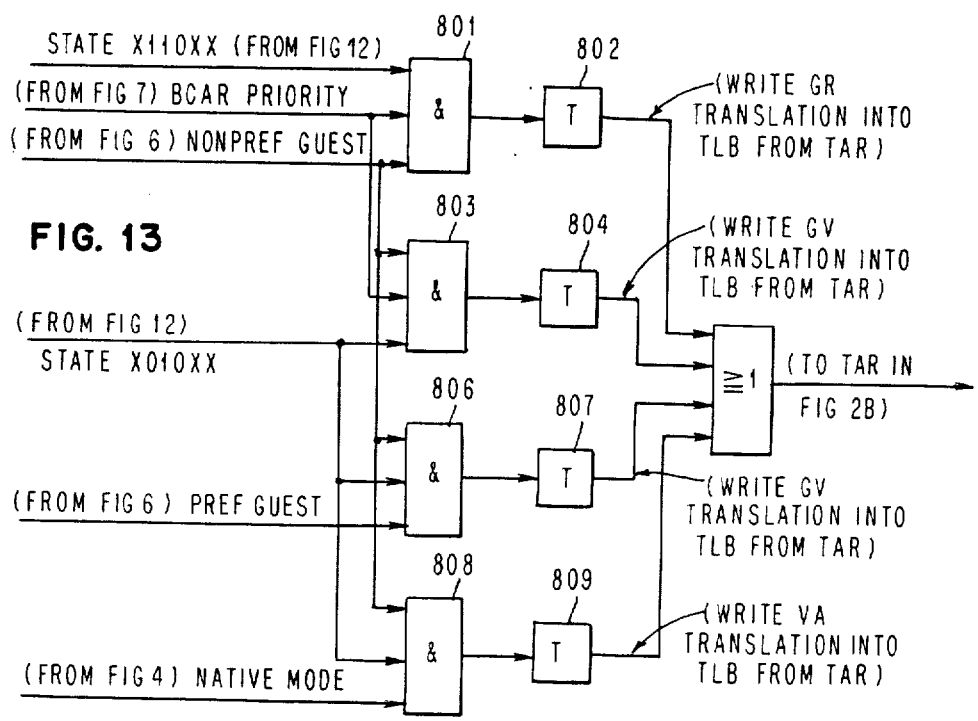

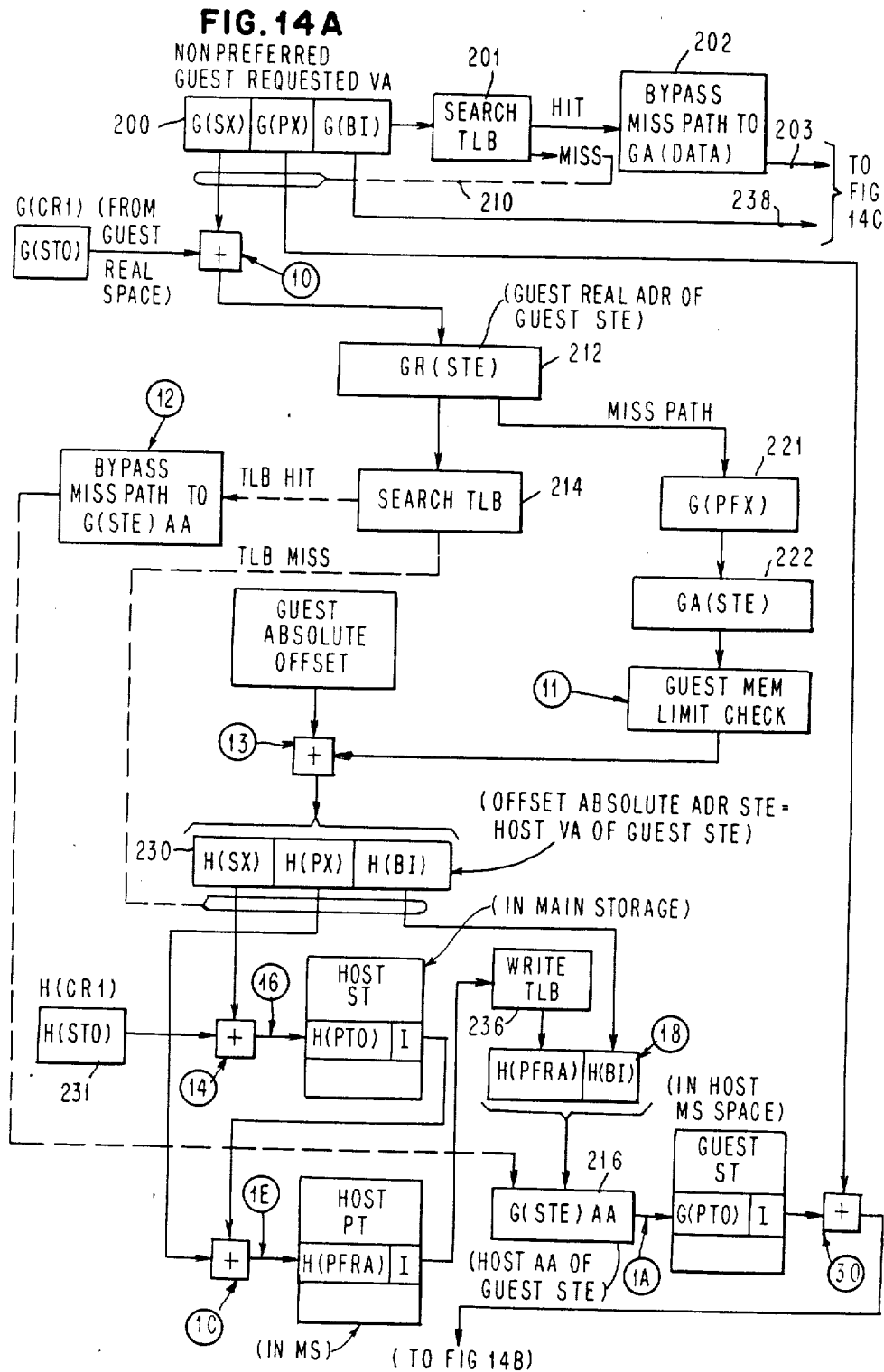

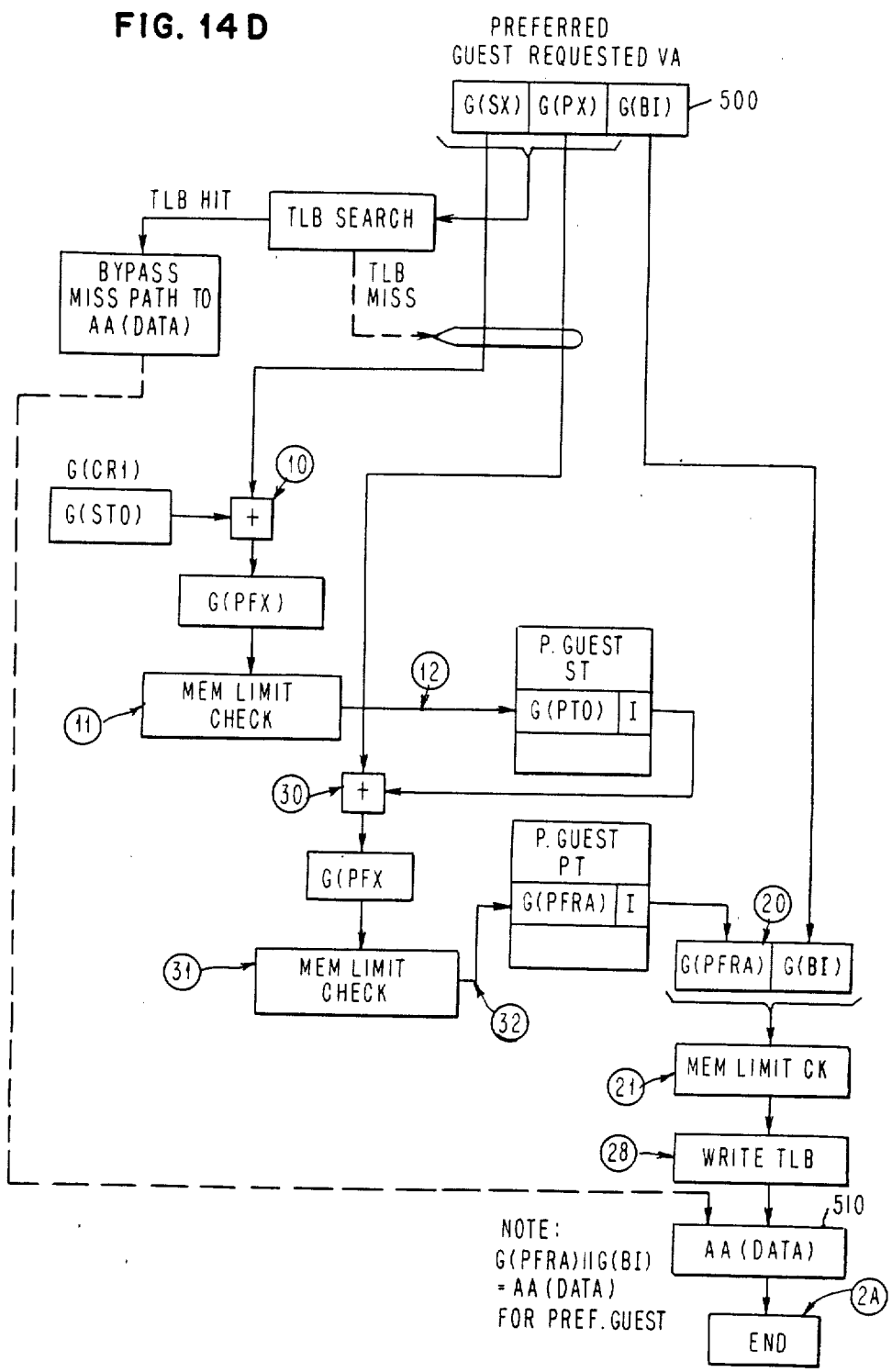

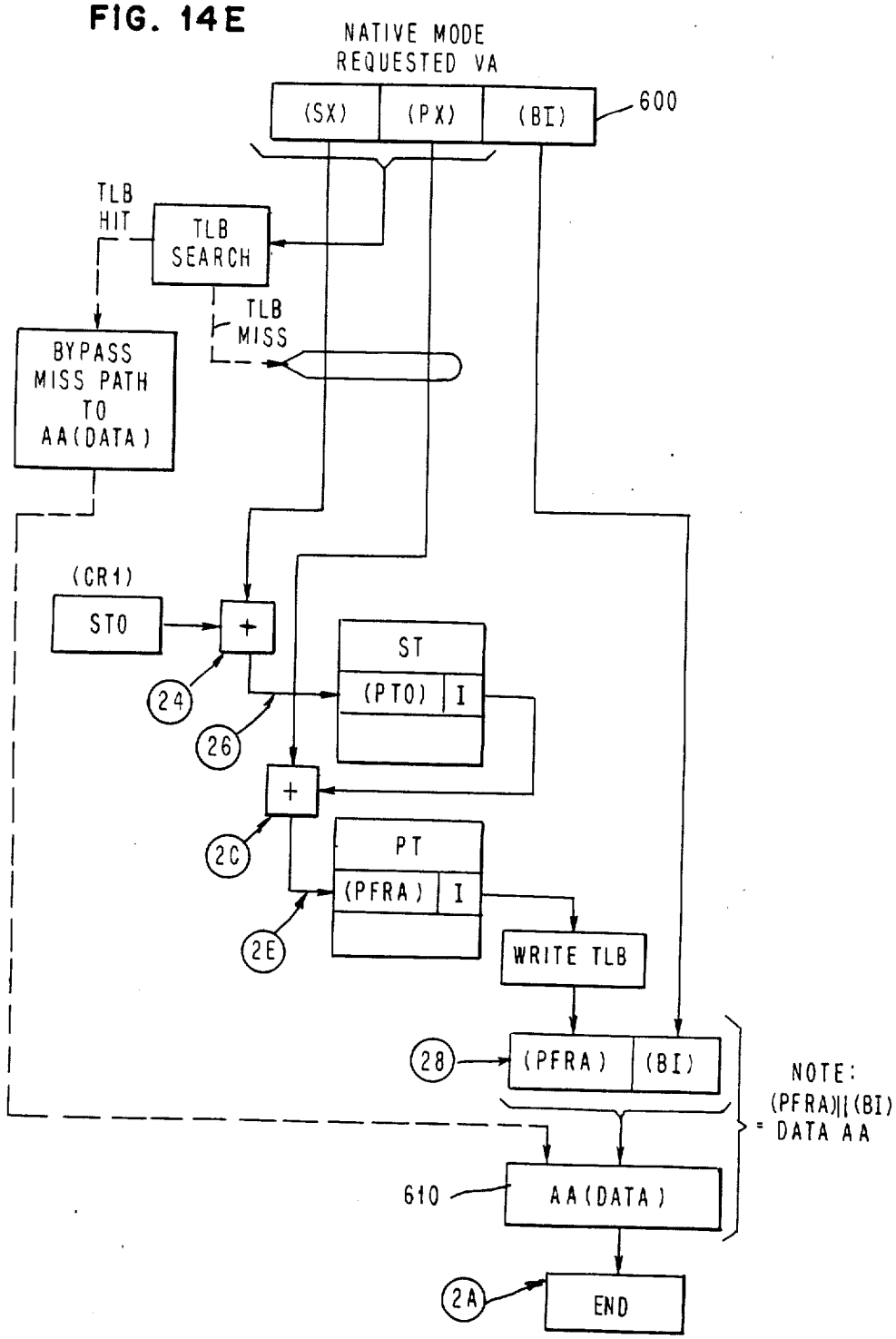

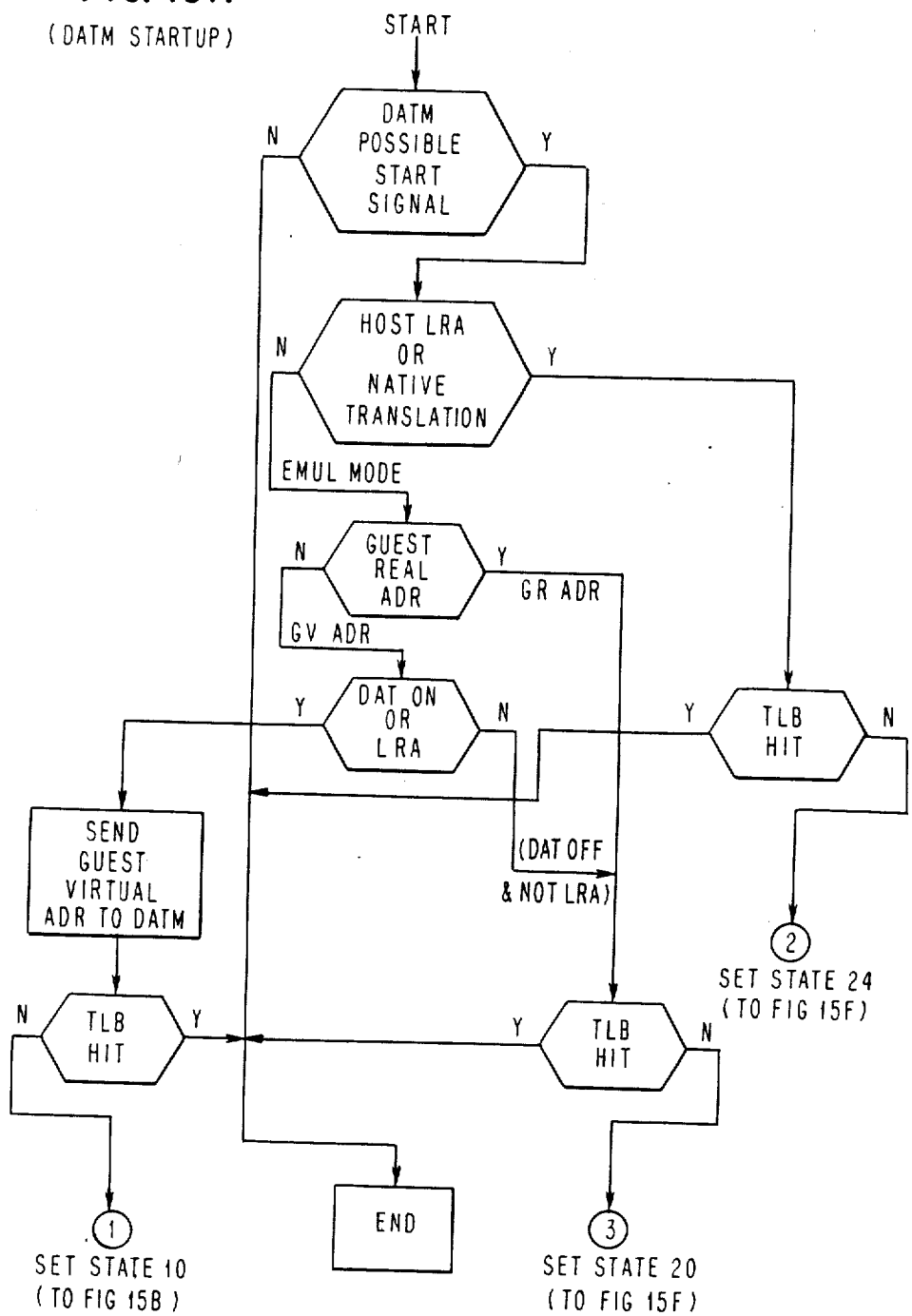

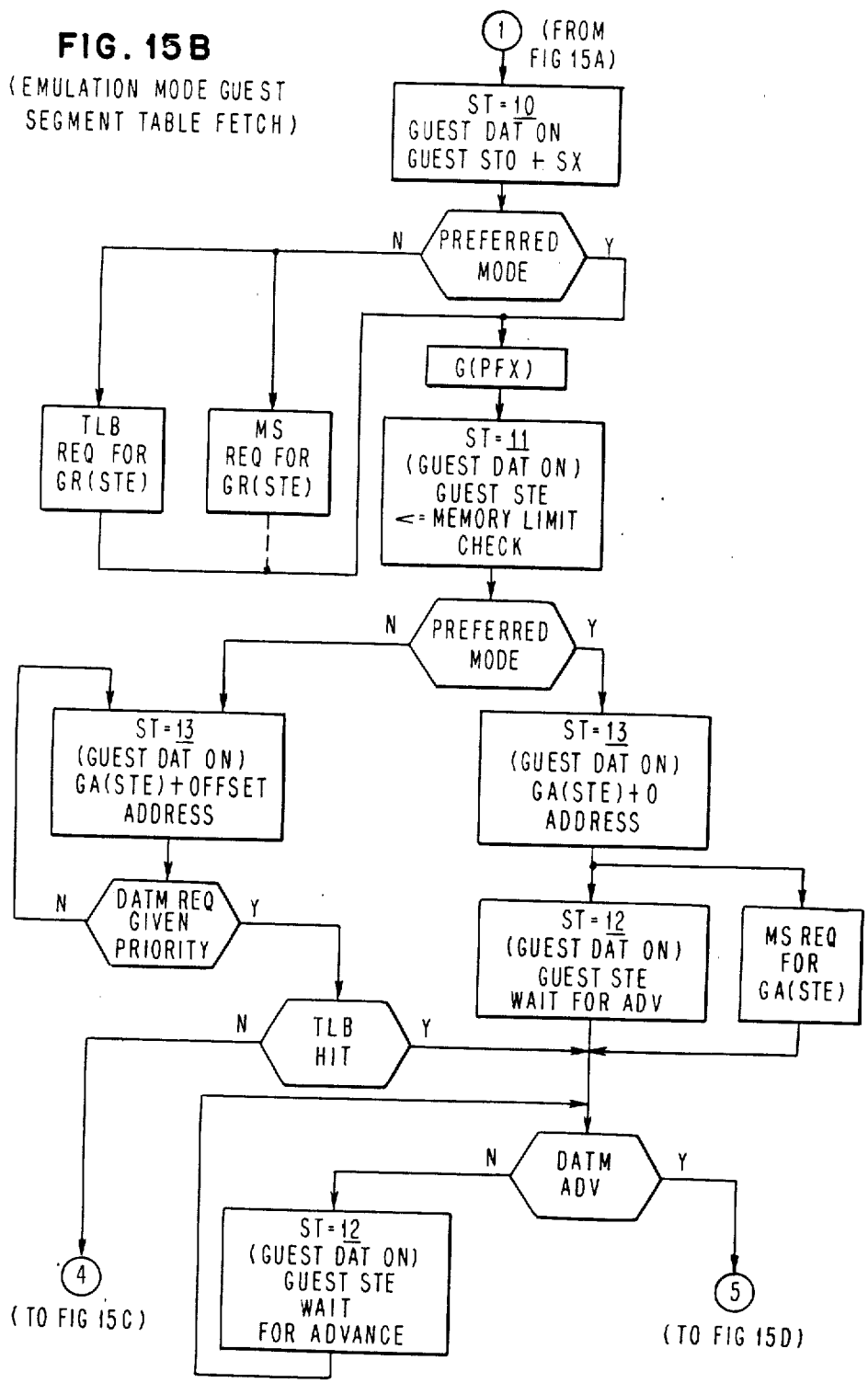

(HOST TRANSLATION OF GUEST SEGMENT TABLE ENTRY ADDRESS)

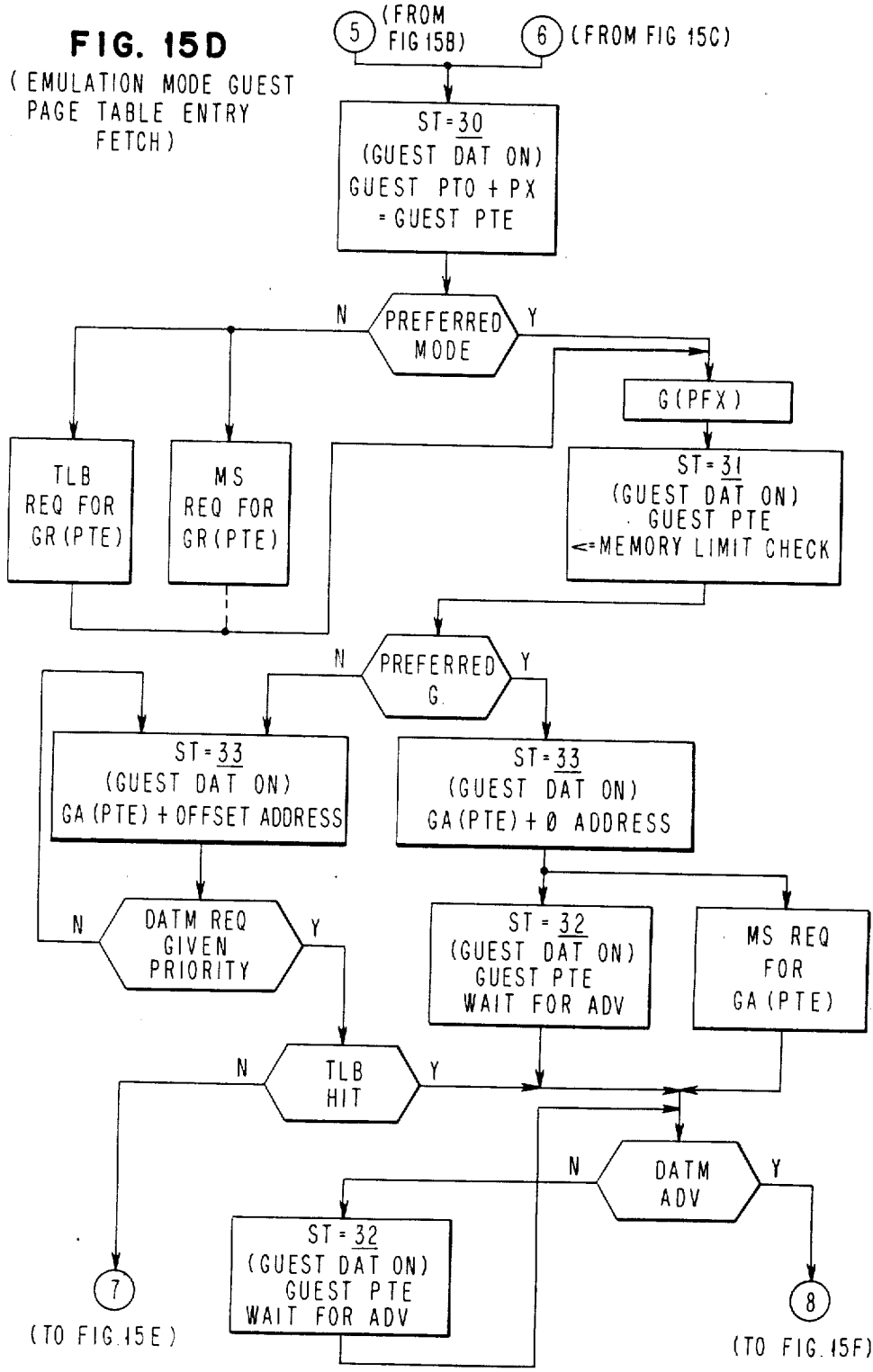

(HOST TRANSLATION OF GUEST PTE ADDRESS)

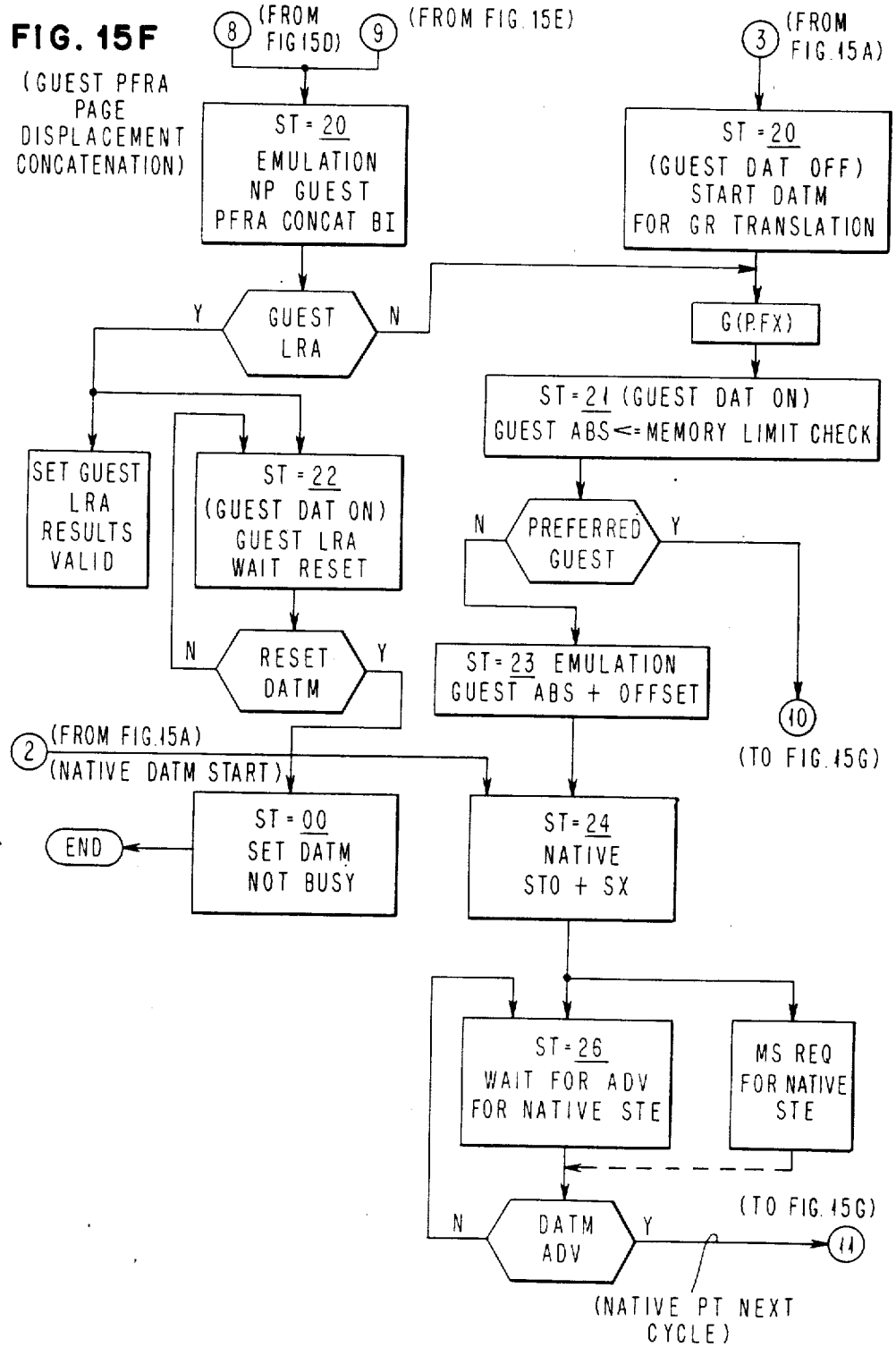

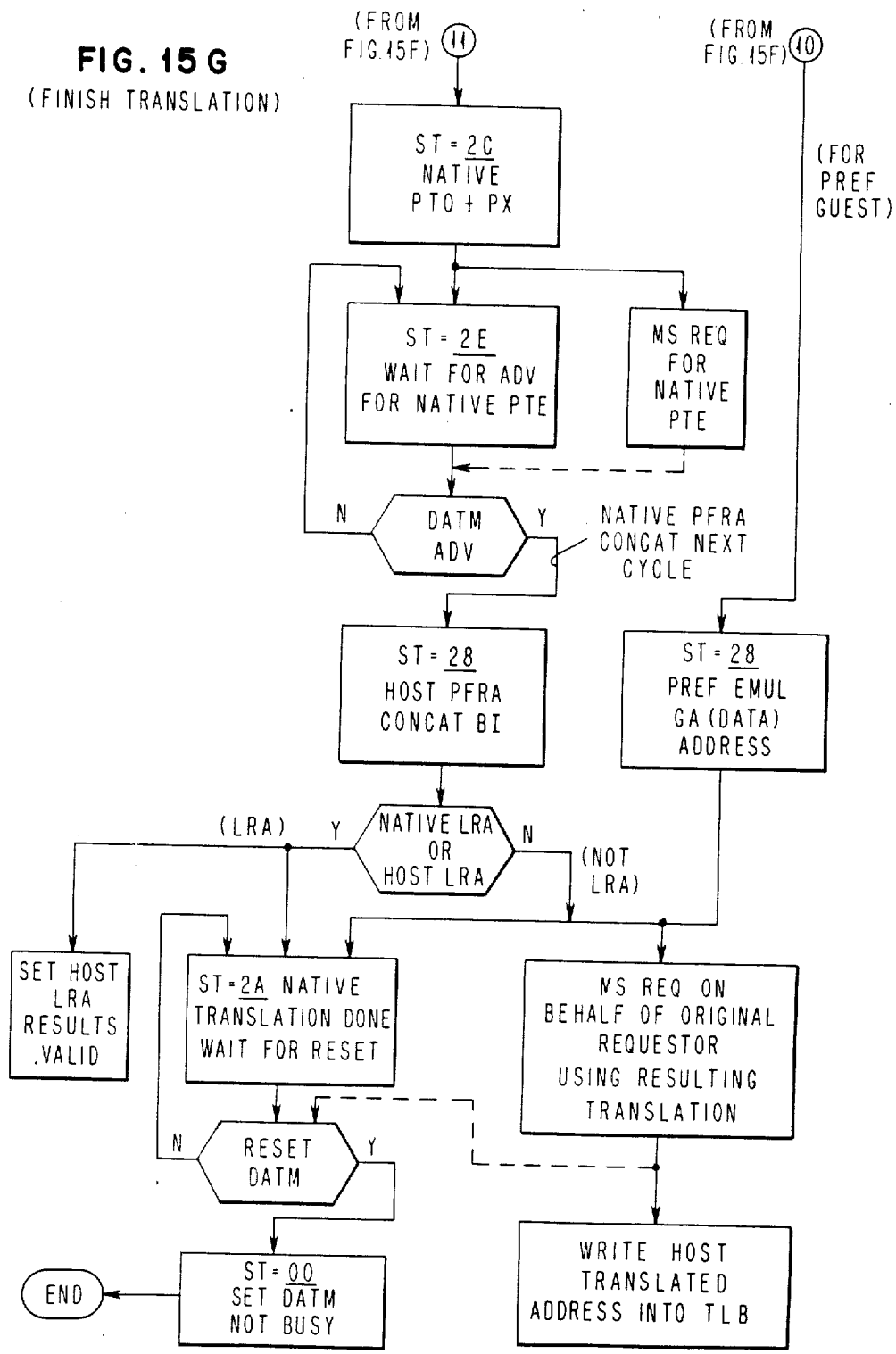

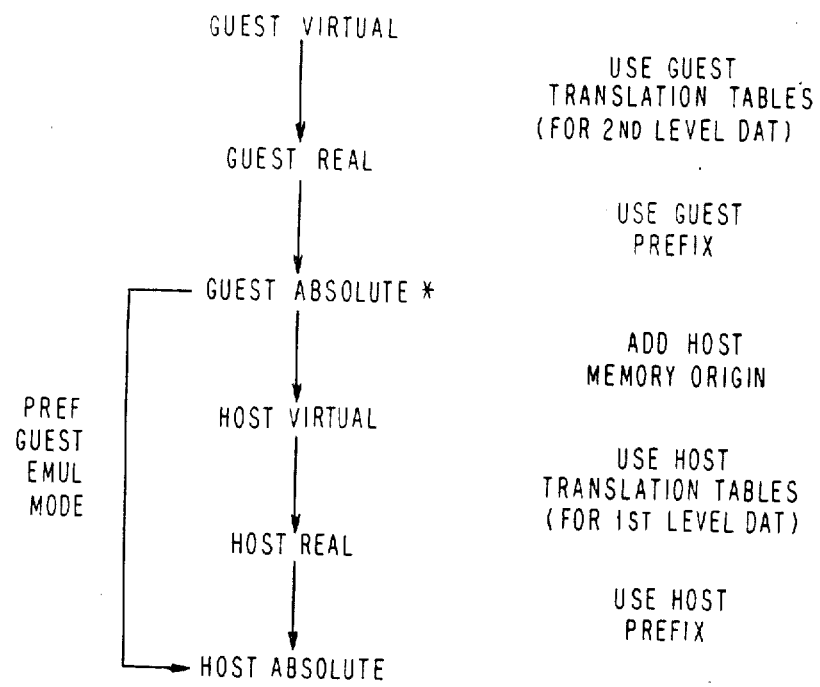
PRIOR ART
FIG. 16  (GUEST ADDRESS TRANSLATION)
\* NOTE  FOR A PREFERRED GUEST:
GUEST ABSOLUTE ADDRESS = HOST ABSOLUTE ADDRESS

FAST TWO-LEVEL DYNAMIC ADDRESS TRANSLATION METHOD AND MEANS

INTRODUCTION

The invention relates generally to a data processing system having both dynamic address translation (DAT) capability and emulation capability for emulating another architecture which also has DAT capability.

Listed below are abbreviations and acronyms used in this specification

| | |
|---|---|
| AA | Absolute Address |
| BC | Basic Control Mode (S/360) |
| BCAR | Buffer Control Address Register |
| BCE | Buffer Control Element (contains cache controls and TLB) |
| BDBO | Buffer Data Bus Output (Cache Output Bus) |
| BI | Byte Index (Part of Virtual Address) |
| C | Common Segment Bit |
| CR | Control Register |
| DATM | Dynamic Address Translation Mechanism |
| DIAR | DATM Input Address Register |
| DLS | DATM Local Store |
| EC | Extended Control Mode (S/370) |
| EE | Execution Element (in CPU) |
| G | Guest |
| H | Host |
| I | Invalid Bit |
| IE | Instruction Element (in CPU) |
| LA | Logical Address |
| LFAR | Line Fetch Address Register |
| LRA | Load Real Address Instruction |
| LRU | Least Recently Used |
| LSAR | Line Store Address Register |
| ML | Memory Limit (extent) |
| MP | Multiprocessing System |
| MS | Main Storage |
| OFFSET | (Guest Storage in Main Storage) |
| PP | Page Protect Bit |
| PFRA | Page Frame Real Address |
| PFX | Prefix |
| PT | Page Table |
| PTE | Page Table Entry |
| PTL | Page Table Length |
| PTO | Page Table Origin |
| PX | Page Index (Part of Virtual Address) |
| RA | Real Address |
| SCE | System Control Element |
| ST | Segment Table |
| STE | Segment Table Entry |
| STO | Segment Table Origin |
| SX | Segment Index (Part of Virtual Address) |
| TAR | Translator Address Register |
| TBLR | Table Register |
| TLB | Translation Lookaside Buffer |
| UP | Uniprocessing System |
| V | Valid Bit |
| VA | Virtual Address |
| XL | Translation |

In the prior art, the System/370 BC (basic control) mode causes the CPU to operate with the S/360 architecture which does not used DAT. The S/370 EC (extended control) mode uses the S/370 architecture which uses DAT that involves translation of addresses using segment and page tables in real storage. The 370 DAT is a single level process in EC mode by which a requested virtual address is translated to a real address, as follows:

1. A STO (segment table origin) is selected from a control register, e.g. CR1. The STO is the real address in main storage of the beginning of the segment table.

2. A segment index (SX) portion of the virtual address being translated is added to the STO to generate the real address of a segment table entry (STE), which contains a required page table origin (PTO). The STE is then fetched from main storage.

3. The page index (PX) portion of the virtual address is then added to the PTO to generate the real address of a page table entry (PTE). The PTE is then fetched from main storage.

4. The PTE contains a required page frame real address (PFRA) which locates a page frame in main storage containing the addressed data. The PFRA is the translation of the virtual address of the page containing the requested data. Then the PFRA, its virtual address, and flag fields are written into a TLB entry to represent a translation of the page address of the requested data to speed up the accessing of future virtual address requests to the same page.

5. The PFRA is concatenated with the byte index (BI) portion in the virtual address to generate the translated real address of the request data in system main storage. The requested data is then accessed in main storage.

If an invalid bit is on in either the STE or PTE, its content cannot be used. The translation is terminated and an exception is provided to the CPU. If the CPU can page-in the required page table or page, the request may be repeated and translated in the future.

The "native" mode of a CPU is the architectural mode for which a CPU is primarily designed to provide its best performance, and it is considered the non-emulation mode for the CPU. An "emulation" mode of a CPU is an architectural mode other than the native mode, in which the CPU is capable of operating. "Host" is a control program operating in the native mode on a CPU for directly controlling the resources of a system. "Guest" is a control program operating in an emulation mode on a CPU for controlling the apparent resources of the emulated system for application programs executing on the CPU under the guest control program. Hence, the guest controls the resources apparent to the guest, which may be a subset of the system resources controlled by the host. Prior art address translation functions include:

1. For a CPU operating in native mode, its virtual addresses are translated to real addresses while the CPU is in EC mode and DAT mode is on. It then uses the two-table (ST and PT) lookup procedure for single level address translation.

2. For a CPU operating in emulation mode, pageable guest operand and instruction virtual addresses are translated to host real addresses by guest and host segment and page tables using a double level address translation process when a pageable guest is operating in guest DAT on mode, such as described in U.S. Pat. No. 4,456,954, wherein host page frames are dynamically assigned to the guest program at the time that the guest demands another page of main storage space.

3. A preferred guest mode for the CPU is obtained by preassigning to a guest a contiguous area of host absolute storage. The result is translation simplification for a preferred guest, whereby the preferred guest only needs to use single level DAT when operating with guest DAT on.

4. For a CPU in a multiprocessor (MP), each real address to the page frame starting at real address zero is changed by adding a prefix (PFX) value in a prefix register in the CPU. The prefixed page address and all other unchanged page real addresses are then designated as "absolute addresses".

5. For a Load Real Address (LRA) instruction in any executing program, the virtual address from the instruction is translated to a real address which is returned to the CPU along with a condition code.

6. IBM publication number SA22-7095-0 published January 1984 entitled "System/370 Interpretive Execution" describes the emulation of a guest machine on a host machine using the Start Interpretive Execution (SIE) instruction for operating a plurality of virtual machines (VMs) on a host machine. It specifies how the amount of guest main storage may be specified as an extent which is located for a pageable guest within the host address space by a guest main storage origin value, and how a guest prefix value locates a guest real page zero.

Prior CPU's contain a translation lookaside buffer (TLB) which receives each CPU virtual address request. If the address translation of the virtual storage request is not found in a TLB entry, the DAT process is performed to place the translation in a TLB entry.

Prior DAT means operate to provide native mode translations, as follows:

1. Compute Segment Table Entry (STE),
2. Fetch STE in main storage,
3. Compute Page Table Entry (PTE),
4. Fetch PTE in main storage to obtain a page frame real address (PFRA),
5. Concatenate PFRA and Byte Index (BI) to obtain requested real address,
6. Apply prefix (if data is in page 0) to requested real address to generate requested absolute address.
7. Fetch requested data.

No translation is done: (1) by some system control instructions while DAT is on when the instruction is defined to contain a real address, and (2) by any storage request when the CPU is running in BC mode, or in EC mode with DAT off.

Emulation mode has subset modes of "preferred" and "non-preferred". "Preferred" is an emulation mode which specifies that the guest absolute address equals the host absolute address (with a host offset specified for the guest, which usually is zero) in order to provide a shortcut in the guest translation sequence. If the preferred guest DAT is on, each preferred guest absolute address equals a host absolute address (with a host offset), and only the guest single level DAT operation is done. If guest DAT is off, the preferred guest requested addresses (with an offset) equal the host absolute addresses, and no DAT operation is done. In other words, the "preferred guest mode" implies a guest can operate with the same DAT efficiency as the host, while the "non-preferred mode" implies the guest has a significantly lower DAT efficiency than the host.

A "preferred guest" also can directly manage its preassigned system storage and a subset of I/O resources without having to utilize the "host" control program, while a "non-preferred" guest (i.e. pageable guest) cannot directly manage any of the system resources but must entirely operate through the host control program.

FIG. 16 illustrates different types of address translations in the prior art, such as guest virtual, guest real, and preferred guest address translations. Status triggers in the CPU indicate the current address mode. A virtual address is indicated by a storage address from an executing program while the dynamic address translation (DAT) bit is on (i.e. called DAT on) in the CPU's program status word (PSW). Real addresses from an executing program are indicated by the CPU's PSW having its DAT bit off, i.e. DAT off. Emulation mode in the IBM 370XA architecture is entered by execution of a Start Interpretive Execution (SIE) instruction which has a State Description (SD) table in main storage that defines the state of the emulated CPU. A host program executes a SIE instruction to transform the CPU into emulation mode and start execution of a guest program with the next instruction to be executed. The guest program continues execution until it causes an interruption or interception event that shifts control back to the host control program.

BRIEF SUMMARY OF THE INVENTION

The subject invention provides a unique hardware arrangement for generating double-level translations in combination with a translation look-aside buffer (TLB) structure. The invention can support the 370/XA SIE (start interpretive execution) instruction in order to eliminate the need for slow-operating software TLBs TLBs (i.e. shadow tables) previously used with VM/370, or double-level DAT microcode of the type described in U.S. Pat. No. 4,456,954 which interfaces the TLB at the beginning and end of a translation.

Objects of the invention are to provide a hardware double-level DAT mechanism that:

1. Avoids requiring a restart capability for instruction execution microcode for instructions having storage operands. In the prior art, instruction execution microcode (which does not do the DAT function) operates smoothly as long as it gets TLB hits when it attempts to execute the operand fields in an instruction. If a TLB miss is encountered, the instruction execution microcode branches to DAT microcode, which then performs the translation of the operand address, which is put into the TLB. Then the instruction microcode is restarted from its beginning, and it then gets a TLB hit when it reaches the same operand field. Such microcode requires restart controls across the IE to TLB interface within the CPU to restart the microcode after each translation is completed. The subject invention avoids the need for any microcode restart controls for translation purposes.

A microcode interrupt/save alternative which could avoid microcode restarts) would not solve the performance problem, because this alternative requires additional microcode to support interrupt save stacking for each storage operand in the instruction. Interrupt save stacking would store the return point in the instruction microcode (before entering the DAT microcode), so that the instruction microcode can continue from where it was interrupted upon completion of each translation by the DAT microcode. This alternative adds extra microcode requiring extra CPU execution cycles, and the result does not improve system performance.

2. Avoids potential CPU deadlock by instruction execution microcode. CPU deadlock can occur if DAT microcode puts guest intermediate translations into the TLB during a double-level translation, which is inhibited in the prior art. For example, an instruction with two storage operands may require up to three double-level translations: one for the instruction fetch and two for the operand fetches. Each double-level translation includes three intermediate translations. Hence, such instruction could involve up to nine intermediate translations. If two intermediate translations for the second operand use the same TLB congruence class as the first operand translation in a two-way set associative TLB, then the first operand translation will get overlayed before it is used for fetching its data. When the instruction microcode is restarted after the second operand translation, the microcode again has a TLB miss on its previouslytranslated first operand, because its TLB entry was overlayed by a later intermediate translation. The result is that the microcode operation ping pongs between the first and second operand translations due to the intermediate translation overlay, and CPU deadlock results. Prior microcode-controlled translators used a special "inhibit TLB" feature to prevent intermediate-translations from overlaying the content of a valid guest TLB entry for the same instruction in order to prevent microcode deadlock.

3. Writes guest intermediate address translations in into the TLB to speed up future double-level translation requests. In the invention's hardware translator, storage fetch requests are issued immediately upon the completion of every translation, whether final or intermediate, and at the same time each translation is written into the TLB. If the first operand translation in the TLB is overlayed by a later intermediate address translation into the TLB, the data is already accessed in main storage so that no deadlock can result. The intermediate translation in the TLB may be used for a subsequent instruction, and contribute as much or more to system performance than if the first operand translation were retained in the TLB. No TLB inhibit is used. The prior double-level translation process in U.S. Pat. No. 4,456,954 did not write guest intermediate translations into the TLB.

4. Does not interrupt instruction microcode execution for a TLB miss by an operand address requiring a DAT operation, and no microcode restart is needed. The requested operand is received from storage under control of the DAT means of this invention when it is invoked at that point in the instruction microcode normally provided for storage operand accessing. In other words, the instruction microcode using the hardware DAT mechanism of this invention only needs to be executed in its normal sequence without stopping or backing up for any restart upon a TLB miss. Each guest instruction storage request having a TLB miss is speeded up during a double-translation by using any host single-level intermediate address translations which may exist in TLB entries. Hence, this invention puts intermediate translations into a TLB with any set associativity without any concern for deadlock occurring, while gaining added system performance from retaining the intermediate translations in the TLB.

5. Provides an independent mechanism for performing dynamic address translation, which may be embodied entirely in hardware. It can perform all double-level and single-level address translations required by a CPU independent of, and overlapping with, the operation of any instruction execution microcode. Prior microcoded DAT could only handle a restricted subset of translations as "accelerated guest mode" translations, and guest double-level translations were not done in "accelerated guest mode". The types of address translations not done in "accelerated guest mode" were referred to as "non-accelerated guest mode" translations. With the subject invention, no accelerated mode is needed in the systems, because all translations are made at their fastest rate.

6. With the same machine cycle time, the subject invention can perform double-level DAT several times faster than prior microcode-controlled translators to provide an extraordinary speed-up in CPU performance. That is, this invention enables a great reduction in the number of machine cycles needed to perform complex address translations by eliminating instruction microcode restarts, by causing the TLB to store both intermediate and final translations, by fetching all table entries required by intermediate translations, and fetching the requested data with each translation result.

The subject invention provides a state-controlled hardware DAT mechanism (DATM) which combines with a TLB in a CPU to perform all virtual address translations required by any guest, host or native address at high speed. The DATM contains next state logic circuits which automatically sequence the DATM operations through a state register. The state register inputs the current DATM state to control the next state logic circuits, so DATM can generate its next state, which is then put into the state register as the current state to continue the process until DATM completes the translation operation and reaches its non-busy condition.

The internal sequencing of DATM is also controlled by TLB hit/miss and cache hit/miss signals, whether DAT is on or off for the current program, as well as CPU request signals such as whether the request is from a guest or native program, or from a preferred or non-preferred guest program and whether the guest DAT state is on or off, or from a load real address (LRA) instruction in any program.

Some of the DATM states generate storage fetch requests which are followed by a wait for advance state, in which DATM waits for the requested data (e.g. segment or page table entry) to be fetched from main storage.

The DATM sequencing for a double-level translation puts into a TLB entry each intermediate guest translation (e.g. for the guest STE real address and for the guest PTE real address), and then puts the guest requested data absolute address into a TLB as the guest request's virtual address translation. (This guest data absolute address is also the translation of the intermediate host virtual absolute address of the guest data, and the latter intermediate translation is not put into any TLB entry because of the likelihood that it will not be used again in the future.)

The result of putting the two intermediate guest table entry translations into the TLB has the effect of improving system performance because of the likelihood that future guest requests will need to use these intermediate TLB entries.

BRIEF DESCRIPTION OF THE DRAWINGS

FIG. 1 illustrates a data processing system containing an embodiment of the subject invention.

FIGS. 2A, 2B and 2C illustrate a buffer control element (BCE) containing a dynamic address translation mechanism (DATM) with a TLB in a preferred embodiment of the invention which may be used in the system of FIG. 1.

FIG. 3 illustrates the content of each TLB entry in the translation lookaside buffer (TLB) shown in FIG. 2C.

FIG. 4 illustrates logic circuits for starting the DATM.

FIG. 5 shows a timing diagram.

FIG. 6 illustrates circuit logic for the DATM request for BCAR priority.

FIG. 7 is a continuation of the circuitry on the DATM request for BCAR priority.

FIG. 8 illustrates circuitry for the DATM state register bit 0 in the next state logic.

FIG. 9 illustrates circuitry for the DATM state bit 1.

FIG. 10A illustrates circuitry for the DATM state register set signals.

FIG. 10B illustrates circuitry for the DATM state bits 2 and 3.

FIG. 11B illustrates circuitry for the set DATM state register bits 4 and 5.

FIG. 12 illustrates circutiry for the DATM state register.

FIG. 13 illustrates circuitry for providing signals to the translate address register (TAR).

FIG. 15A shows a flow diagram of the DATM start up operation.

FIG. 15B illustrates a flow diagram of the emulsion mode guest segment table fetch operation.

FIG. 15D illustrates emulation mode guest page table entry fetch operation.

FIG. 15F illustrates a flow diagram of the guest PFRE page displacement concatenation.

FIG. 15G is a flow diagram of the finished translation operation.

FIG. 16 illustrates an outline diagram of various types of guest address translations.

DESCRIPTION OF THE PREFERRED EMBODIMENT

Figure 2B:
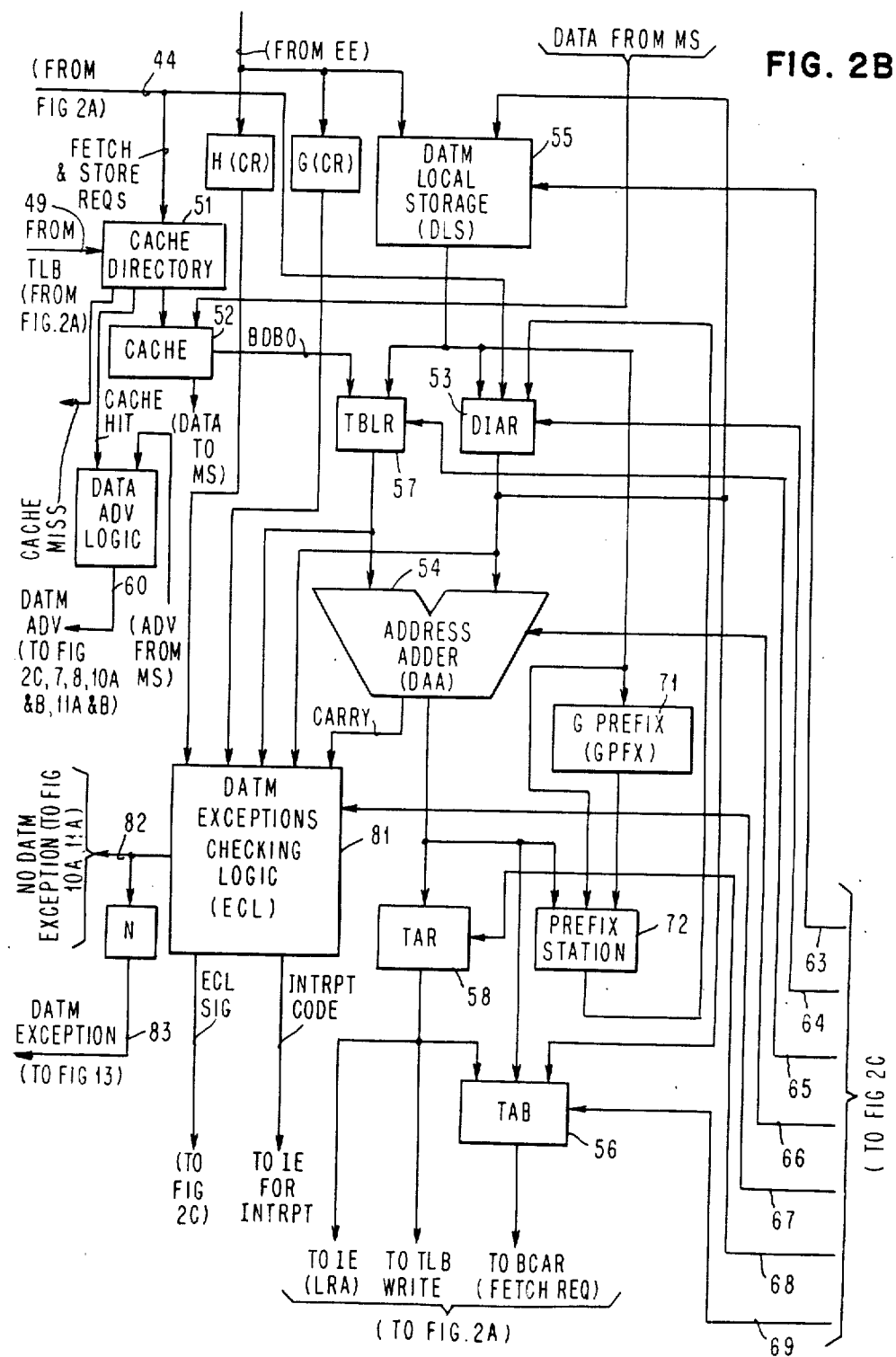

The preferred embodiment is both a method and hardware using the method for translating virtual addresses provided by an executing program in a data processing system. The virtual addresses are generally provided by an instruction unit or execution unit in a CPU in the data processing system.

FIG. 1 illustrates a CPU containing an embodiment of this invention in its buffer control element (BCE), which contains a high speed buffer (i.e. cache). The embodiment comprises a dynamic address translation mechanism (DATM) operating in combination with a translation lookaside buffer (TLB). DATM receives all virtual address (VA) requests in the CPU. The requests are provided on busses 11, 12 and 13. A request command is on bus 11 indicating whether the request is for a fetch, store or load real address (LRA) instruction. The request address is provided on bus 13 on the same cycle as the command.

Specific information about the command and its address is provided by ID bits on the modifier bus 12, such as whether the address is: (1) virtual or real, (2) a fetch or store request, (3) a guest real request, (4) a LRA instruction request, or (5) a host LRA instruction request. When the CPU is not in emulation mode, it is in native mode and its virtual addresses (indicated by the DAT On state) are therefore translated in native mode.

EE busses transmit special information needed by DATM, such as the value of an offset in an Extent Field in the State Description of the current SIE instruction.

A VA request received by the BCE may immediately be accepted by the BCE, or rejected by the BCE sending to the IE a reject delay signal to the IE on a bus 14, which usually results in the IE repeating the request to the BCE on a later cycle.

When the BCE accepts a request, it may immediately service the request, or it may store the request in a register for future servicing. All accepted requests contend for service according to their assigned priorities signalled to a BCE priority circuit, called herein the BCAR priority circuit.

When the BCAR priority circuit gives priority to a request, on the next cycle the request is put into a buffer control address register (BCAR) from which it is accessed by being immediately sent to the TLB for its translation, i.e. corresponding absolute address. If the request's translation does not exist in the TLB (i.e. TLB miss), then the requested VA is provided by BCAR to DATM for translating the VA to its corresponding absolute address.

Associated with BCAR and each major addresscontaining register (e.g. in the BCE, SCE etc.) is an identifier (ID) field which contains information concerning the source and the characteristics of the request address contained in the respective register, such as whether the address is virtual, is for a guest, is for a fetch or store or load real address (LRA) request, etc. As addresses flow through the address registers in the BCE, the ID bits associated with each address are correspondingly transferred to the ID register.

The state of the BCE is initially determined by a group of mode type triggers which must be in a known state in order to predict the operation of the BCE. They are set by command signals provided on mode lines 19 in FIG. 1 when the mode of the IE and EE are changed. The mode triggers are:

1. XA Mode—selects 370 or 370/XA architecture.
2. DAT ON Mode—enables virtual addressing to be used in the CPU.
3. Emulation Mode—enables a guest program to execute on an emulated architecture under a host program which uses the native architecture of the CPU.
4. Preferred Guest (PG) Mode—a guest mode in which the host preassigns a contiguous area of host absolute storage to enable a preferred guest to operate with single-level address translation. Non-Preferred Guest (NPG) Mode—a guest mode in which the host dynamically assigns page(s) in the host virtual storage on demand of the guest. NPG mode is indicated when PG mode is off.

In S/370 and 370XA architectures, address translation (in DAT ON mode) changes a program's virtual address to an absolute address in main storage. In a uniprocessor (UP), absolute addresses are the same as real addresses. In a multiprocessor (MP), absolute addresses are the same as real addresses except for real addresses to the page at real address zero which has its real address modified by a prefix value that is different for each CPU in the MP to locate the special page (i.e. PSA page) assigned to the respective CPU. Each CPU in a MP has its PSA in a different page frame in the tightly-coupled shared main storage. Prefixing is sometimes used in a UP to enable special system control operations.

If the CPU is in DAT OFF mode, all addresses received from the IE are treated as real addresses and no translation is used, but prefixing is always used in an MP.

The first stage for all storage requests in the BCE is prioritizing the requests to maintain a required order in handling the requests. As shown in FIG. 5, each request from the IE is accepted by the BCE during the request's R machine cycle (R cycle). If BCAR is available (i.e. it is given BCAR priority), the request is put into BCAR and sent to the TLB during its next cycle (its C1 cycle), during which a TLB hit or miss is determined. If a TLB miss occurs, the request is inputted by DATM for an address translation by a DATM sequence which started on the previous C1 cycle of the request, if DATM was not busy with some other request.

FIG. 2A shows the BCAR priority circuits 40, BCAR 41 and BCAR ID register 42. The BCAR ID bits in register 42 will indicate the type of request which provided the address currently in BCAR. Control signals may be formed from the state of the BCAR ID bits, such as: guest VA, guest real address (RA), native mode VA, or native mode RA. Fetches and Stores requested by DATM may be blocked by internal exceptional condition signals from DATM.

When a VA is loaded into BCAR, it is outputted from BCAR during the same machine cycle to the TLB in FIG. 2A on bus 43, and to the cache directory 51 and a translator input address register 53 in FIG. 2B. The current STO is selected from CR1 or CR7 in the conventional manner, and provided on line 45 to the TLB arrays X and Y. Also, the TLB and cache directory operate in their conventional manner. Thus, the BCAR address selects one congruence class in the TLB, and a congruence class in the cache directory. The TLB entries in associative array sets X and Y in the selected class are examined and their contents compared in circuits 46 and 47 with the address in BCAR and the selected STO from CR1 or CR7. If a TLB common bit is on, the STO comparison is inhibited. If either X or Y TLB entry compares equal, it provides a TLB hit and its absolute page address (ABS) is gated out of entry X or Y by gate 48X or 48Y. While the TLB is examined, a selected cache directory class is examined in parallel. A match may occur in the selected directory class for any associative entry A, B, C, or D if: (1) the absolute address contained in any entry matches the absolute address gated out of the TLB, and (2) a valid bit is on in that entry.

The cache may be the type described and claimed in U.S. Pat. No. 4,317,168 to B. U. Messina et al with synonym resolution done by the technique described and claimed in U.S. Pat. No. 4,332,010 to B. U. Messina et al, both patents being assigned to the same assignee as this application.

The TLB is sometimes referred to as a directory lookaside address table (DLAT). In this embodiment, it is a two-way set-associative array with 256 entries (128 rows, each of which contains an X set entry and a Y set entry). As new addresses arrive at the BCE from the IE, they are used to address the TLB when they get BCAR priority. Then a comparison is performed on the output of the TLB and the BCAR address. When a match occurs (i.e. TLB hit), the request proceeds through the cache (if there is a cache directory hit). If a TLB match does not occur (i.e. TLB miss), the TLB is forced to signal DATM to start an address translation, after which the newly translated address is placed in an LRU selected entry in the addressed TLB congruence class. Valid absolute addresses in the TLB locate 4KB page frames in main storage.

As shown in FIG. 3, each TLB entry in set X and Y contains the following fields:
1. Segment Table Origin (STO) bits 8–25 for S/370, or bits 5–19 for 370/XA.
2. Virtual Address bits 1–12.
3. Absolute Address bits 5–19.
4. Guest real bit (G).
5. Emulation flag.
6. Valid bit.
7. Common segment (C) bit.
8. Page Protect (PP) Read Only (RO) bit.

A line fetch register (LFAR), not shown, may be used when a request results in a cache directory miss (that is, the required line of data is not available in the cache). Then the request's absolute address is obtained and is gated in LFAR. A line fetch request is then initiated to the SCE which controls the fetch in main storage. Line fetches provide a line of several doublewords from main storage through the SCE to the BCE, which loads the new line into the cache, and writes a corresponding entry in the cache directory.

A line store address register (LSAR), not shown, may be used whenever a cache line castout is required (either by cross interrogation from the SCE or by a least-recently-used (LRU) algorithm within the BCE), in order to make the LRU entry in the cache available for a new line being fetched. The absolute address of the line to be castout is placed in the LSAR, and a request is made to the SCE, which put it into main storage. The absolute address in the LSAR is obtained from the cache directory at the time the directory miss is detected.

When a VA request is given BCAR priority and inputed into BCAR in FIG. 2A, the VA is also outputted from BCAR to a DATM input address register DIAR 53 during the C1 cycle in which it is sent to the cache directory. The inputting of a VA into DIAR 53 during the request's C1 cycle starts the DATM for a sequence of operations in DATM which translate the received VA in accordance with the information in the BCAR ID register 42 and the current modes set in the BCE. The DATM is activated in the next cycle C2 (see FIG. 5).

DIAR 53 is a 28-bit register with an output connected to one side of a DATM address adder 54. DIAR 53 outputs its VA when gated by a signal on line 64 when a TLB miss signal is received by the DATM next state logic circuits 61 in FIG. 2C. DLS holds each virtual address during the entire time it is being processed in DATM until it is written into the selected TLB entry at the end of a translation. DIAR receives the guest VA from DLS. DIAR holds the guest VA during DATM processing, except during any guest VA translation while DIAR must hold the guest absolute address, host virtual address, or the guest real address. When the guest VA is needed by DIAR, it is copied from the DLS. The output of DIAR 53 is connected to BCAR 41 through a translator address bus (TAB) 56 in order to select the required TLB entry, and then write the VA into the TLB entry simultaneously while the translated AA is written into the TLB entry from TAR 58.

Also input and output paths are provided between DIAR 53 and a DATM local store (DLS) 55. The address output of adder (DAA) 54 can be returned to DIAR with or without guest prefixing applied by the prefix station 72 in FIG. 2B.

A table register (TBLR) 57 receives the various STOs, offsets, memory extents from DLS 55 and translation table entries from cache 52, and provides them to adder 54 for adding the virtual address indices (SX, PX, and BI) provided from DIAR 53. Thus, TBLR 57 receives STOs, offsets and memory extents, from the DLS 55 and receives the PTOs and PFRAs from the cache 52.

The address adder 54 is a two-port, 30-bit carry lookahead adder used for address computation during translation. One side of the adder receives the output of the TBLR 57 and the other side receives the output of the DIAR 53. The adder 54 adds the contents of the TBLR 57 to the contents of the DIAR 53 as specified in FIGS. 14A-E. The two inputs are aligned, the ignored fields are masked off, and the rest of the bit positions are padded with zeroes.

The adder output is placed in a translator address register (TAR) 58, a prefix station 72 and directly to TAB 56. In some cases, adder 54 adds zero to the DIAR output in order to flush the DIAR's contents through to the TAR 58 and prefix station 72, and also can add zeroes to TBLR output in order to flush the TBLR contents to TAR 58 and prefix station 72.

TAR 58 holds the addresses for table fetches and the final translated address. The output of TAR 58 is provided: (1) to the instruction element (IE) for the result of a LRA instruction execution, (2) to the TLB to write therein its AA translation, and (3) to BCAR 41 through TAB 56 for a TLB search.

In FIG. 2B, prefix station 72 converts guest real addresses outputted from adder 54 to guest absolute addresses.

A guest prefix register (GPFX) 71 holds the guest prefix value from the DLS. The GPFX is loaded into the DLS 55 by the set prefix instruction during emulation or by the SIE instruction execution. The GPFX contents are compared with each real address from the adder output to apply prefixing to the real address to generate the absolute address, which is then placed into DIAR for memory limit checking. Memory limit checking involves subtracting the generated address from the extent value from a current SIE state description, and the result must be positive or an addressing exception is provided.

The adder output can also bypass the prefix station 72 back to DIAR 53, such as for memory limit checking not proceeded by a prefix operation.

A DATM local storage (DLS) is an array used to hold all the system control addresses and parameters necessary in the CPU for fast translation. In emulation mode, the DLS also holds guest addresses, as well as host addresses. Also, the DLS stores partial results during the translation process. The DLS array is used as a local storage facility to contain up to sixteen 32-bit words plus a parity bit per byte. System control instructions load the DLS from the EE. A second write port to the DLS is fed from the output of the DIAR to save addresses and partial results. The following items are stored in DLS:

1. Host STO and ST length
2. Guest STO and ST length (from SIE)
3. Guest Memory Offset (from SIE)
4. Guest Memory Limit (from SIE)
5. Logical Address Saves
6. Absolute Address Saves
7. Partial Translation Results DATM Exception Checking Logic (ECL) 81 circuits detect if any exception occurs during a translation of a guest or native VA. When a guest VA is being translated by DATM, the ECL 83 provides a guest identification signal with each guest exception. Exception output codes are provided to the IE and to FIG. 2C to signal and identify the cause of each current exception, including: STE or PTE invalid bit on, STE or PTE outside the specified table length, the guest absolute address is greater than the specified memory limit, guest low storage protect violation, or guest violation of the guest segment or page protection. The memory limit is checked by adder 54 comparing the guest address to the guest extent obtained from the DLS.

The preferred embodiment of DATM is organized as a plural state machine, which can operate in any of the following five translation modes:

1. Native mode
2. Emulation (i.e. guest) modes:
   a. Preferred, DAT off (Preferred Guest Real)
   b. Preferred, DAT on (Preferred Guest Virtual)
   c. Non-Preferred, DAT off (Nonpreferred Guest Real)
   d. Non-Preferred, DAT on (Nonpreferred Guest Virtual)

Each of these five DATM translation modes is executed as a sequence of primitive machine states.

The code for each primitive state is represented by a six bit position field, 0-5, in a DATM state register 90 in FIG. 2C. Each primitive state in the register 90 controls a current subset of component translation operations which are executed by DATM during the current machine cycle, during which the DATM next state logic circuits (DNSL) 91 generate the next state for register 90.

FIGS. 14A-E represent the operational sequences of primitive machine states showing them as two digit hexadecimal (HEX) numbers inside of respective circles. Each two digit hexadecimal number is representative of a six bit code, in which the rightmost four binary digits are represented by the right hexadecimal digit and the leftmost two binary digits are represented by the left hexadecimal digit.

The outputs of the DATM state register 90 are provided to DATM gating logic circuits 92 to generate output signals from FIG. 2C which are provided to FIG. 2B to control the operations of the DLS 55, DIAR 53, adder 54, ECL 81, TAR 58, TBLR 57 and TAB 56.

The following TABLE lists each of the DATM primitive machine states as one of the 32 bit combinations available in the six position DATM state register, as follows:

TABLE 1

DATM PRIMITIVE STATES

| STATE BINARY | HEX | NEXT CYCLE OPERATION |
|---|---|---|
| 000000 | 00 | NOT BUSY |
| 00XXX1 | | * |
| 00XX1X | | * |
| 00X1XX | | * |
| 001XXX | | * |
| 010000 | 10 | P or NP Guest STO+SX |
| 010001 | 11 | P or NP GA(STE) < = Memory Limit |
| 010011 | 13 | P or NP GA(STE) + Offset |
| 010010 | 12 | P or NP Guest Real STE Wait for Advance |
| 010100 | 14 | Host (STO+SX) for NP Guest STE |
| 0101X1 | | * |
| 010110 | 16 | Host STE for NP Guest STE Wait for Advance |
| 011100 | 1C | Host (PTE+PX) for NP Guest STE |
| 0111X1 | | * |
| 011110 | 1E | Host PTE for NP Guest STE Wait for Advance |
| 011000 | 18 | Host (PFRA Concat BI) for NP Guest STE |

TABLE 1-continued

DATM PRIMITIVE STATES

| STATE BINARY | HEX | NEXT CYCLE OPERATION |
|---|---|---|
| 0110X1 | | * |
| 011010 | 1A | Guest Real STE Wait for Advance |
| 110000 | 30 | P or NP Guest PTO+PX |
| 110001 | 31 | P or NP Guest PTE < = Memory Limit |
| 110011 | 33 | P or NP Guest GA(PTE) + Offset |
| 110010 | 32 | P or NP Guest Real PTE Wait for Advance |
| 110100 | 34 | Host (STO+SX) for NP Guest PTE |
| 1101X1 | | * |
| 110110 | 36 | Host STE for NP Guest PTE Wait for Advance |
| 111100 | 3C | Host (PTO+PX) for NP Guest PTE |
| 1111X1 | | * |
| 111110 | 3E | Host PTE for NP Guest PTE Wait for Advance |
| 111000 | 38 | Host (PFRA Concat BI) for NP Guest PTE |
| 1110X1 | | * |
| 111010 | 3A | NP Guest Real PTE Wait for Advance |
| 100000 | 20 | P or NP Guest Real (PFRA Concatenate BI) |
| 100001 | 21 | P or NP Guest AA < = Memory Limit |
| 100011 | 23 | P or NP Guest AA + Offset |
| 100010 | 22 | DAT On Guest LRA Wait for Reset |
| 100100 | 24 | Native STO+SX |
| 1001X1 | | * |
| 100110 | 26 | Native STE Wait for Advance |
| 101100 | 2C | Native PTO+PX |
| 1011X1 | | * |
| 101110 | 2E | Native PTE Wait for Advance |
| 101000 | 28 | Native (PFRA Concatenate BI) |
| 1010X1 | | * |
| 101010 | 2A | Native Translation Done, Wait for Reset |

NOTE:
*Code is not used, < = means less than or equal to, P means preferred, and NP means nonpreferred.

During preferred guest operation, an offset value of zero is used.

Note that the primitive state is DATM "not busy" state, which is indicated by all zeroes in the DATM state register. DATM must be in not busy state before it can be set to any new translation mode for starting a translation for a next address.

Subset combinatorial states for certain bit positions in the DATM primitive states have specific meanings. For example, the leftmost bit positions 0,1 have the following meanings when used while the CPU is in emulation mode (e.g. during SIE instruction execution) for translating any virtual address for any guest (either preferred or nonpreferred), as follows:

TABLE 2

| Bit Position | | |
|---|---|---|
| 0 | 1 | Function |
| 0 | 0 | Translator not busy |
| 0 | 1 | Guest Segment Table Operations |
| 1 | 1 | Guest Page Table Operations |
| 1 | 0 | Guest PFRA Operations or Native Translations |

TABLE 3

| Bit Position | | |
|---|---|---|
| 2 | 3 | Function |
| 0 | 0 | Guest PX or SX add operation or a guest concatenate operation |
| 0 | 1 | Host or native SX add operation |
| 1 | 1 | Host or native PX add operation |
| 1 | 0 | Host or native PFRA operation |

The rightmost state register bit positions 4,5 identify the type of operation as represented in the following TABLE:

TABLE 4

| Bit Position | | |
|---|---|---|
| 4 | 5 | Function |
| 0 | 0 | SX or PX Add, or BI Concatenate |
| 0 | 1 | Memory Limit Check |
| 1 | 1 | Offset Add |
| 1 | 0 | Wait for Advance or Reset |

Since the DATM must be able to switch between guest and host operation during emulation mode translations, registers are provided in DATM for both the guest CR and host CR.

DATM attempts to get a head start on each possible translation request by starting a DATM sequence before DATM is notified of a TLB miss by the request. This is seen in the timing diagram of FIG. 5.

Figure 14B:
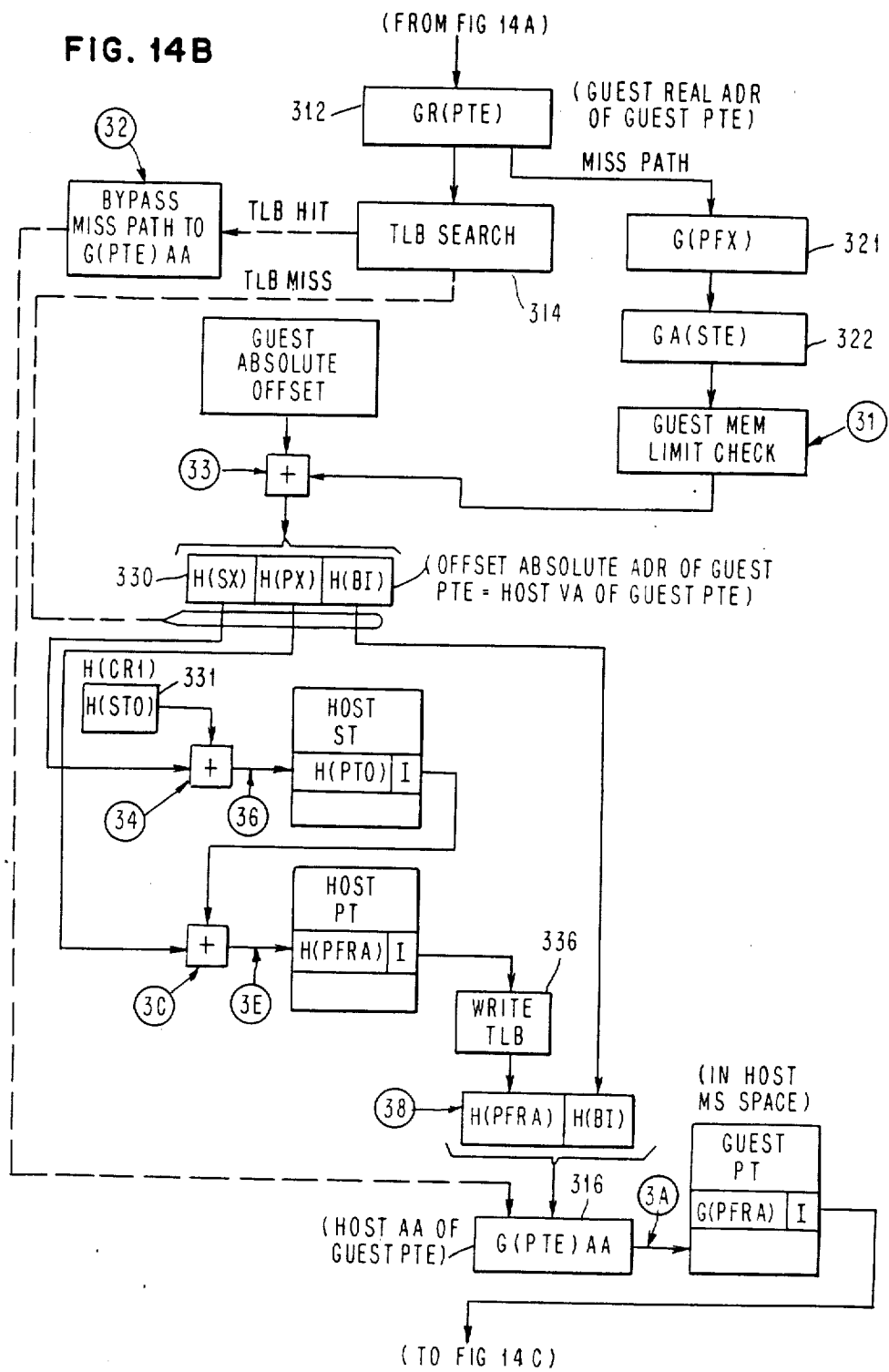
FIGS. 14A, B and C illustrate DATM operations for a nonpreferred (i.e. pageable) guest.
FIG. 14D illustrates DATM operations for a preferred guest with DAT on, and FIG. 14E illustrates DATM operations in native mode.
Figure 14C:
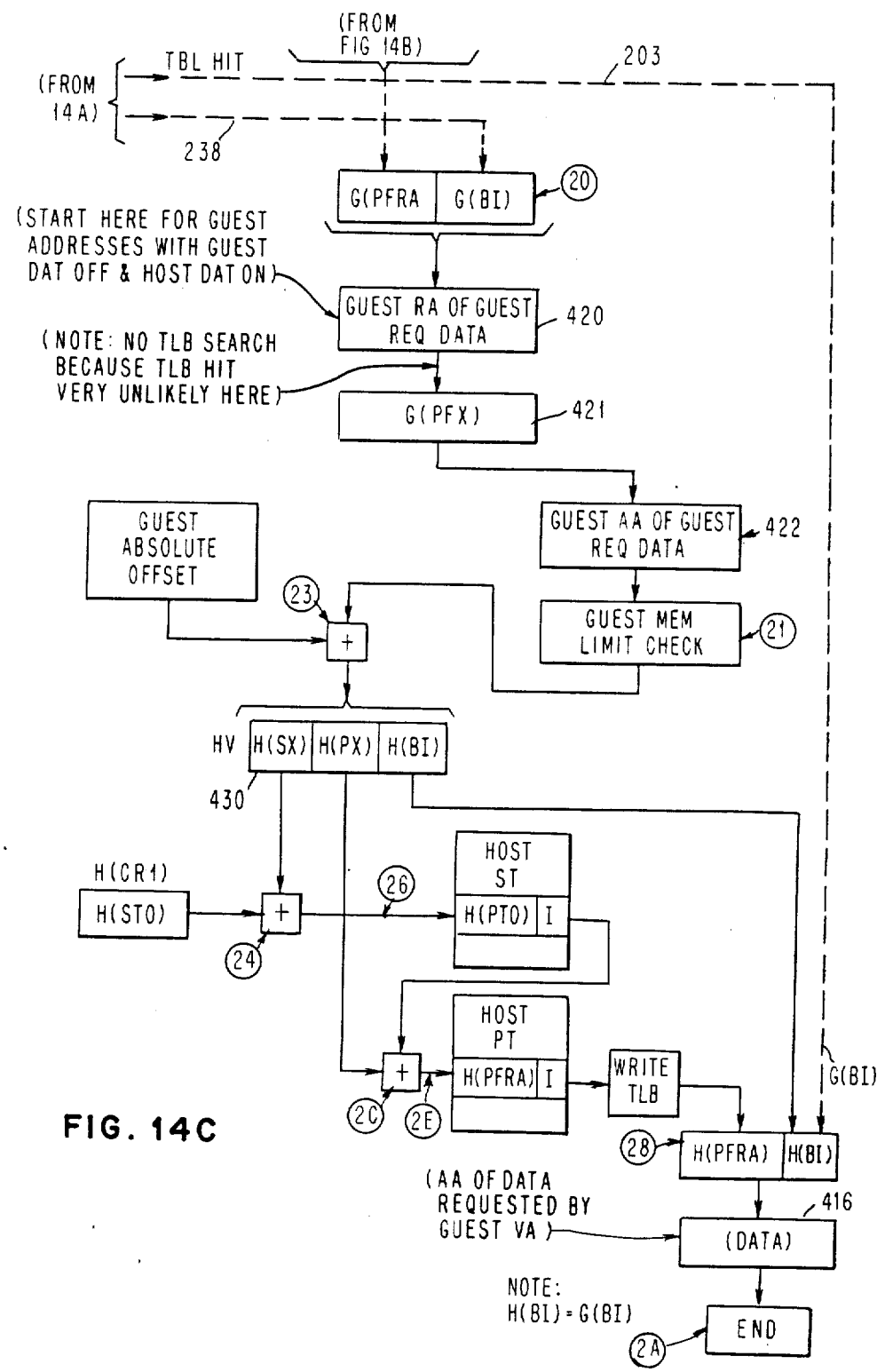
Figure 15C:
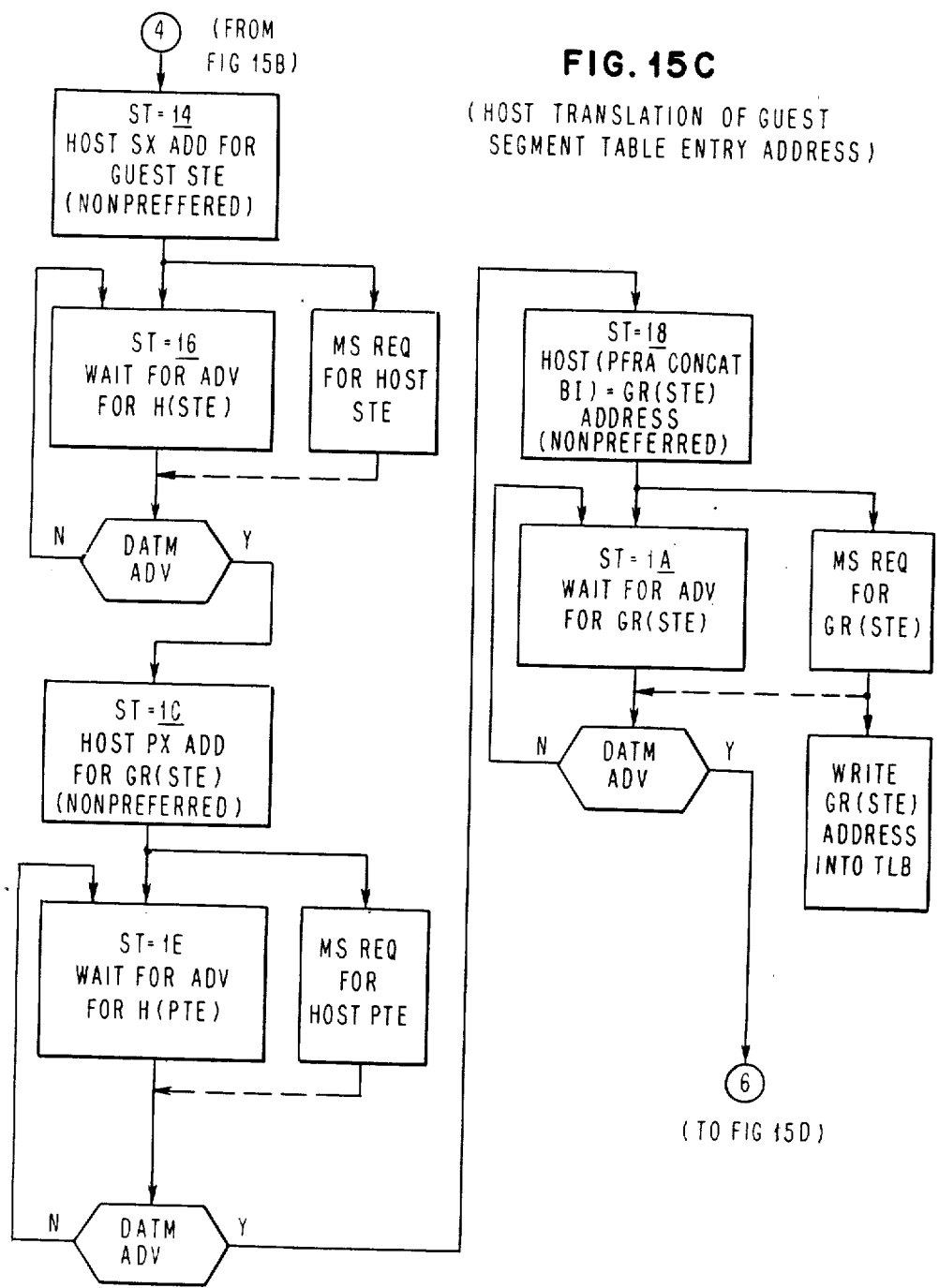
FIG. 15C illustrates host translation of guest segment table entry addresses.
Figure 15E:
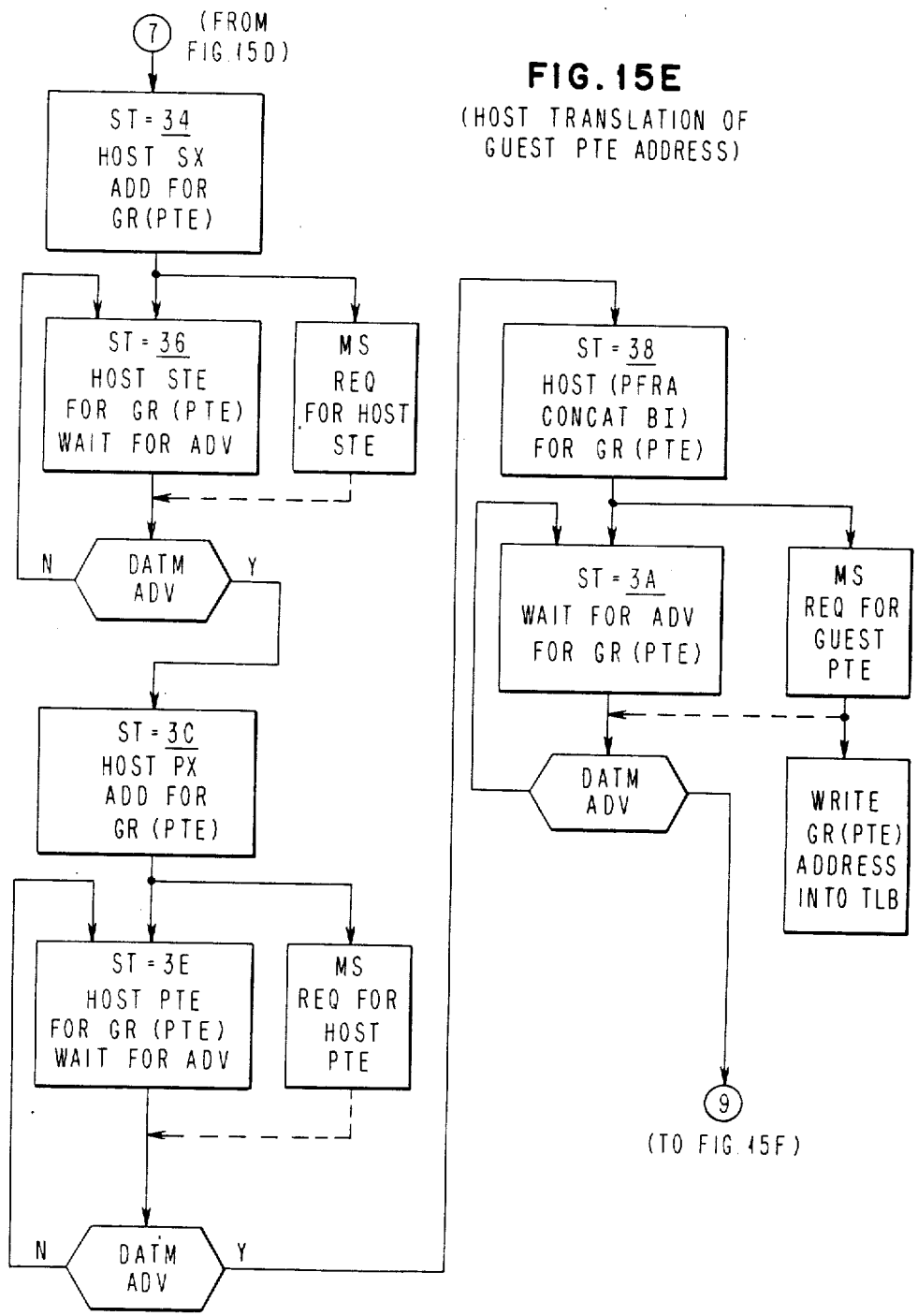
FIG. 15E illustrates a flow diagram of the host translation of guest PTE addresses.

The DATM sequence of primitive state codes in register 90 in FIG. 2C are diagrammed for each of the following translation types:

| Translation Types | Primitive State Sequence Shown In |
|---|---|
| NP Guest VA to AA | FIGS. 14A, B and C |
| NP Guest RA to AA | FIG. 14C |
| P Guest VA to AA | FIG. 14D |
| Native VA to AA | FIG. 14E |

FIG. 4 shows the circuit logic for starting a DATM sequence for any of these types of requested translations during the machine cycle that an IE request is accepted by BCAR, if DATM is not busy during that cycle. An output signal from AND circuit 101 starts the DATM sequence whenever a storage access or LRA request from BCAR activates AND gate 101. The activating conditions are caused by a BCAR ID not real (e.g. virtual) store request signal or fetch request signal from AND gate 102 or 103, respectively, or a LRA request signal from AND gate 104; they require that there be no inhibit signal from AND gate 106 caused by any of its input conditions, or by a low-storage-protect violation signal to gate 101.

The translation type is identified to DATM by signals from the EE setting a plurality of mode triggers in DATM, which include:

1. An emulation mode trigger 108 in FIG. 4, which when set on indicates emulation mode. All requests made during emulation mode are guest requests. While trigger 108 is set off, all requests are identified as native requests.

2. A DAT mode trigger 109 in FIG. 4, which when set on indicates DAT mode. Storage access requests made during DAT mode are identified to DATM as virtual addresses (VAs) requiring translation. While trigger 109 is set off (DAT Off), access requests are identified to DATM as having real addresses (RAs), which do not require address translation.

3. A preferred (P) guest mode trigger 11 in FIG. 6, which when set on (while emulation trigger 108 is set on) indicates preferred guest mode. All requests made during preferred guest mode are to be handled by DATM as preferred guest requests. While the preferred guest trigger 111 is set off, the nonpreferred (NP) guest mode exists (while emulation trigger 108 is set on), and then the requests to DATM are NP guest requests.

4. A request during P or NP guest mode will be a guest virtual (GV) or guest real (GR) request in accordance with the on or off state, respectively, of the DAT trigger 109 in FIG. 4.

Mode triggers 108, 109 and 111 are set to an on or off state before a DATM sequence is started by an output from gate 101 in FIG. 4, and they are independently reset by respective reset signals from the EE when the respective mode is ended.

In the CPU, the current program status word (PSW) has a DAT ON trigger which is only set to the DAT state of either: (1) the native DAT state if not in emulation mode, or (2) the guest DAT state if in emulation mode.

FIGS. 14A, B and C diagram the DATM sequence of operations for the translation of a NP guest VA 200 in FIG. 14A. When this address is accepted by BCAR 41 in FIG. 2A, it automatically is sent to the TLB to perform a TLB search, shown in 201 in FIG. 14A. If its translation exists in a TLB entry, a TLB hit will occur, and step 202 will bypass the miss path in FIGS. 14A, B and C. In FIG. 2A, a TLB hit activates gate 48X or Y to output the requested data absolute address (AA) for the translation which locates the required guest page frame in main storage (MS) containing the NP guest requested VA. The AA is shown in FIG. 14C with DATM code 28, which represents the DATM operation of concatenating the page frame AA with the guest byte index G(BI). This generates the guest requested data AA 416, which completes the entire translation operation, if the required TLB entry exists.

However, the required TLB entry may not exist, and a TLB miss must happen on each first request to any guest page. In FIG. 14A, a TLB miss by step 201 takes the miss path 210, which utilizes the G(SX) and G(PX) fields in the requested VA. The guest translation also uses the guest segment table address (STO) that is a real address (not requiring translation) obtained from the guest CR1 field, G(CR1), in the state description in main storage located by the currently executing SIE instruction.

In FIG. 14A, DATM at this time provides state code 10 in register 90 in FIG. 2C to add G(STO) and G(SX) to obtain the real address of the guest's STE, GR(STE) 212. (In FIGS. 14A-E, the DATM state codes are shown in circles to distinguish them from reference numbers.) This is done by adder 54 adding the STO in TBLR 57 to the SX field from the guest requested VA in DIAR 53. Address 212 is inputted into BCAR 41 in FIG. 2A to initiate a TLB search, shown as step 214 in FIG. 14A to test if this GR(STE) has a valid TLB entry.

If a TLB hit is obtained, the DATM code 12 is generated in register 41 in FIG. 2C, and in FIG. 14A the TLB hit path is taken, wherein code 12 causes DATM to wait for an advance signal from the cache that it is sending the guest segment table entry (STE), which is addressed by G(STE)AA 216. Then the miss path has been bypassed from the guest real address 212 to the host AA 216.

But, if a TLB miss is obtained by GR(STE) 212, the miss path must be taken, in which step 221 in FIG. 14A applies any required guest prefix, G(PFX), which value is provided by the CPU to DLS 55 in FIG. 2B from the current SIE SD in main storage. This prefixing is done by DATM prefix station 72 in FIG. 2B to the GR(STE) output from adder 54 to station 72 to generate the GA(STE) 222 in FIG. 14A, which is then loaded into DIAR 53 after the DIAR content (i.e. guest requested VA) is saved in DLS 55.

Then in FIG. 14A, a guest memory limit check is done by DATM in response to code 11, which causes the GA(STE) value in DIAR 55 to be subtracted from a memory extent loaded into TBLR 57 from DLS 55, which the CPU had obtained from the current SIE SD. If the GA(STE) exceeds the extent, an exception signal is provided on line 83 from ECL 81 in FIG. 2B, which causes the translation process to be terminated for this guest requested VA.

Figure 11A:
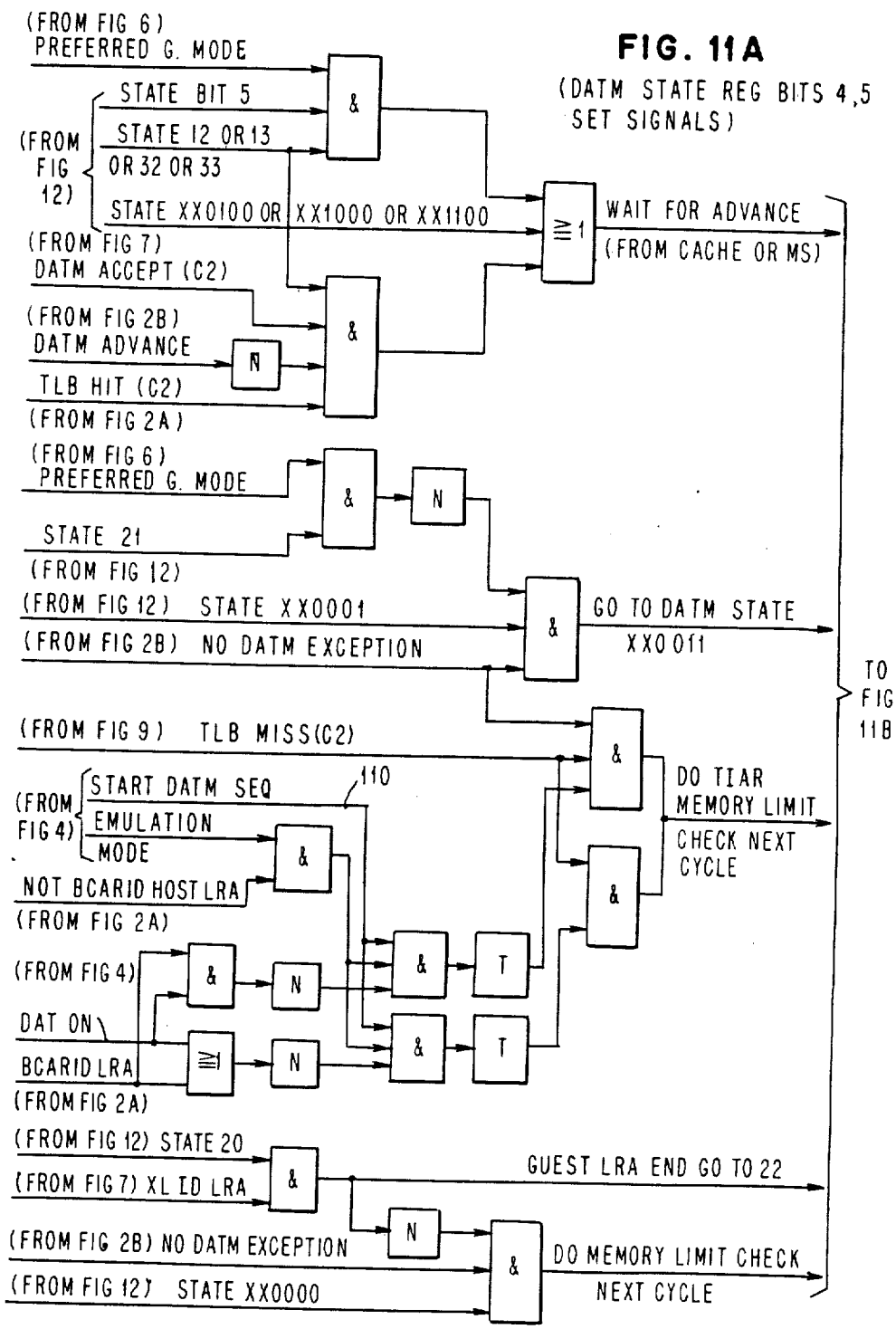
FIG. 11A illustrates circuitry for the DATM state register bits 4 and 5 set signals.

If a no exception signal is provided on line 82 from ECL 81, then DATM code 13 is generated in register 91 in FIG. 2C by the circuits in FIG. 11A, and the guest memory offset is loaded into TBLR 57 from DLS 55. During state 13, adder 54 adds the offset to the GA(STE) value in DIAR 53 to generate the offset AA of the guest STE, which is the host VA 230 in FIG. 14A, and loading it into DIAR 53.

Host VA 230 is then translated using the host segment and page tables by loading the host STO from H(CR1) into TBLR 57 and providing code 14. During state 14, adder 54 performs H(STO)+H(SX) to generate the real address of the required H(STE) and code 16 is generated in register 91 to cause DATM to wait for an advance signal for the H(STE) to be fetched from either the cache or MS. Then DATM generates a fetch request to BCAR 41 using the H(STE) absolute address which bypasses the TLB. When H(STE) is fetched, it is loaded into TBLR 57, and code 1C is generated in state register 91. No TLB search or translation is done for H(STE) because its absolute address was directly obtained.

During state 1C, adder 54 adds the H(PX) field from DIAR 53 to the H(PTO) field of the H(STE) in TBLR 57 to generate the address of a required H(PTE), a fetch request is made to BCAR 41, and code 1E is generated in state register 91, which puts DATM in a wait state for an advance signal. The advance signal indicates the H(PTE) has been fetched from the cache or MS and loaded into TBLR 57, code 18 is generated in register 91. No TLB operation or any translation is used for H(PTE) because it is directly generated as an absolute address.

Also, a TLB entry is written by step 236 in FIG. 14A as the translation of GR(STE) 212. Code 18 causes adder 54 to concatenate the H(PFRA) field from TBLR 57 with the H(BI) field from DIAR 53 to generate the host AA of the guest STE, G(STE) AA 316 in FIG. 14B; and state 1A is generated in register 91 to put DATM in a wait state. DATM generates a fetch request for this G(STE) and when it is received it is put into TBLR 57. Preferably, the fetch request and the writing of the TLB entry are done during the same cycle by the hardware circuits.

The NP guest requested address 200, previously saved in DLS 55, is reloaded into DIAR 53. Then adder 54 adds the G(PX) field from DIAR and the G(PTO) field from the G(STE) in TBLR 57 to obtain the guest real address of the guest PTE, GR(PTE) 312, which is loaded into BCAR 41 to cause the TLB to be searched for any existing translation of GR(PTE) into an absolute address.

If a TLB hit occurs for GR(PTE), the GR(PTE) AA 316 in FIG. 14B is immediately obtained from the TLB, and the miss path for GR(PTE) in FIG. 14B is bypassed.

If a TLB miss occurs for GR(PTE), the miss path in FIG. 14B is executed to generate G(PTE)AA 316 in the same manner as described for the miss path in FIG.

14A, except that DATM states 32 or 31, 33, 34, 36, 3C, 3E and 38 are used instead, and a TLB entry is written by step 336 for GR(PTE).

When G(PTE) AA 316 is obtained (either by a TLB hit, or by generation along the TLB miss path), a DATM fetch request to the cache is generated using G(PTE) AA, and DATM code 3A is also generated in register 91 to put DATM in a wait state. Upon a cache miss, a request to MS is generated.

After an advance signal is provided from the cache, the G(PTE) is put into TBLR 57, the NP guest requested VA (which was saved in DLS 55) is loaded into DIAR 53, and DATM code 20 is generated in register 91. A TLB entry is written for GR(PTE) under the control of AND gate 801 in FIG. 13 during state code 38 from FIG. 12 to gate out the AA translation in TAR 58 in FIG. 2B.

During state 38, adder 54 concatenates the G(PFRA) field from the G(PTE) in TBLR 57 and the G(BI) field from the guest requested VA in DIAR 53 to generate the real address (RA) 420 of the guest requested data. Also state 20 causes the guest prefix, G(PFX), to be applied, as required, by station 72 in FIG. 2B to the RA of the guest requested data to change it to absolute address 422 in FIG. 14C; and state 21 is generated in register 91.

Then, DATM state 21 is executed during the next cycle to perform the guest memory limit check, and generate state 23 in register 91.

If no exception is generated due to the limit check, state 23 causes the guest absolute offset to be added to absolute address to generate the host virtual (HV) address 430 of the guest requested data and put it into DIAR 53; and generate code 24 in register 91. The HV address 430 in DIAR 53 is also the host VA 430 of the guest requested data, which must next be translated in the overall translation process.

Then state 24 causes adder 54 to add the H(SX) from the H(VA) in DIAR to the H(STO) from H(CR1) to generate the absolute address of a required host STE. A DATM fetch request is generated using this H(STE) absolute address, and sent to BCAR 41, but no TLB operation is used here due to the BCAR ID bits indicating an absolute address, and state 26 is generated in register 91.

During state 26, DATM is put in a wait state until an advance signal is later received from the cache that H(STE) has been fetched. It is put in TBLR 57, and state 2C is generated in register 91.

During state 2C, adder 54 adds the H(PX) from the H(VA) in DIAR to the H(PTO) field from the H(STE) in TBLR 57 to generate the absolute address of a required host PTE. A DATM fetch request is generated using this H(PTE) absolute address, sent to BCAR 41; and state 2E is generated in register 91.

During state 2E, DATM is put in a wait state until an advance signal is later received from the cache that H(PTE) has been fetched. It is put into TBLR 57, and state 28 is generated in register 91.

The TLB entry for the NP guest requested VA 200 in FIG. 14A can now be written using the H(PFRA) last fetched. Adder 54 also concatenates the H(PFRA) to the H(BI) obtained from H(VA) 430 in DIAR 53 to generate the absolute address 416 of the data requested by the NP guest VA 200.

If a TLB miss had occurred for guest requested VA 200, a TLB entry is written now under the timing control of AND gate 803 in FIG. 13 during state code 28 from FIG. 12 to gate out the AA translation in TAR 58 in FIG. 2B.

It is noted that the H(BI) in HV 430 will have the same value as the G(BI) in NP guest VA 200.

The process of translating the NP guest VA 200 is completed, and code 2A is generated in register 91 to cause the reset of DATM.

In the preferred embodiment in FIG. 14C, the guest RA 420 of the guest requested data is not sent to the TLB for a search to avoid providing a new entry in the TLB if a TLB miss resulted. The reason is that the chances of a TLB hit for this guest RA are considered very slight, in view of this RA translating to the same AA as the guest VA 200, which previously obtained a TLB miss at the beginning of the same NP guest VA translation process. Since the chances of a miss are high, it would create the likelihood of the generation of another TLB entry having a duplicate AA, and this is avoided to prevent the overlaying of what is likely to be a more useful entry in the TLB.

The translation performance of a TLB miss for a NP guest VA 200 in FIG. 14A in the preferred embodiment is for a reasonable likelihood of TLB hits for its GR(STE) 212 and its GR(PTE) 312, and the single level process of translating the GR(DATA) 420. This optimum double-level translation then reduces to two TLB hits and a single level address translation. This is greatly different from a native single level translation, since two sequential TLB hits involve only a small percentage of the cycles of a native single level translation.

Even if only one TLB hit is obtained during a two-level translation, a significant saving in access time is still obtained.

However, even if no TLB hits are obtained during a two-level translation, the hardware DATM described herein performs several times faster than any prior software or microcoded two-level address translator.

FIG. 14D illustrates the process of the DATM in FIGS. 1-13 for translating a preferred guest requested VA 500 to the absolute address 510 of the requested data when a TLB miss occurs for the preferred guest VA 500. When the preferred guest translation is completed, the TLB entry is written using the AA in TAR 58 in FIG. 2B under the timing control of AND gate 806 in FIG. 13 which is activated by DATM state 28.

FIG. 14E illustrates the process of the DATM in FIGS. 1-13 for translating any native mode requested VA 600 into an absolute address 610 for the requested data when a TLB miss occurs for the native mode request 600. When the native mode translation is completed, the TLB entry is written using the AA in TAR 58 in FIG. 2B under the timing control of AND gate 808 in FIG. 13 which is activated by DATM state 28.

The triggers 802, 804, 807 and 809 in FIG. 13 are single cycle triggers which provide a single cycle delay in the transfer of the signal provided from a respective AND gate to an OR circuit 811, which output a signal on line 68 that activates TAR 58 in FIG. 2B. Thus, the circuits in FIG. 13 are in the DATM gating logic 92 in FIG. 2C.

During the DATM sequenced operations for a translation in FIGS. 14A-E, DATM makes its own storage fetch requests to the BCAR 41 for host STEs and PTEs which do not require any translation. To avoid TLB use, DATM sets the BCAR ID bits to indicate they are real or absolute addresses, which will inhibit the use of the TLB but still allow the real or absolute address request to be accessed in the cache and generate a request to MS upon a cache miss.

The DATM makes its storage requests to the BCE with higher priority than IE requests.

FIGS. 6 and 7 combine to provide the circuits in the embodiment for making a DATM fetch request to BCAR 41, which are made through an OR circuit 700 in FIG. 7, which provides an output that sets on a DATM request trigger 701. It outputs a DATM request to BCAR priority logic 40 (also shown in FIG. 2A). When trigger 701 is set on, it outputs an R cycle. When BCAR accepts the DATM request, it sets off trigger 701 and activates accept trigger 701 for one cycle (i.e. the C1 cycle), and in the next cycle another accept trigger 702 is activated (the C2 cycle).

In order for DATM to control which requests are to access, or not access, the TLB, it contains circuits in FIG. 7 which control the setting of a guest real (GR) flag bit in the BCAR ID register 42 in FIG. 2A. If the GR bit is off, the request is a host real (HR) request, which is not translated. Thus, when the GR flag bit is set on for a BCAR request, it signals a TLB search for that request, and writes a TLB entry if a TLB miss occurs.

A trigger 711 in FIG. 7 sets on the GR bit in the BCAR ID register when the BCAR priority logic accepts a DATM request if an AND gate 712 is then activated. Gate 712 is activated if it receives an active output from an AND gate 714. Gate 714 receives the nonpreferred (NP) guest mode signal from FIG. 6 and the X100XX states from FIG. 12. The X100XX states include 10, 11, 13, 12 and 30, 31, 33, 32 in FIGS. 14A and B in order to allow the DATM request wait for BCAR acceptance to overlap the DATM operations of prefixing, limit checking and offsetting.

While the invention has been particularly shown and described with references to a preferred embodiment thereof, it will be understood by those skilled in the art that the foregoing and other changes in form and details may be made therein without departing from the spirit and scope of the invention.

Having thus described our invention, what we claim as new and desire to secure by Letters Patent is:

1. A method for obtaining dynamic address translation (DAT) for a nonpreferred guest (NPG) requested virtual address (VA) for guest requested data or instructions utilizing a translation lookaside buffer (TLB) for storing recent address translations, when a TLB miss occurs for a NPG requested VA, comprising the steps of:

sequencing hardware logic circuits to perform the DAT for the NPG requested VA by:
firstly generating a guest real (GR) segment table entry (STE) address by adding a guest segment table origin (STO) and a segment index (SX) field from the NPG requested VA, searching the TLB for the GR STE address,
having a TLB hit during the TLB search for the GR STE address, obtaining the translated GR STE address from the TLB, and bypassing sequencing steps available in the hardware logic circuits for generating a translation of the GR STE address,
secondly, accessing a guest STE with the translated GR STE address, obtaining a page table origin (PTO) field in the guest STE, adding a page index (PX) field of the NPG requested VA to the obtained PTO field to generate a GR address of a page table entry (GR PTE address), searching the TLB for the GR PTE address,
having a TLB hit during the TLB search for the GR PTE address, obtaining the translated GR PTE address from the TLB, and bypassing sequencing steps available in the hardware logic circuits for generating a translation of the GR PTE address.

2. A method as defined in claim 1, further comprising the steps of:
thirdly, accessing a guest PTE with the translated GR PTE address, obtaining a page frame real address (PFRA) from the accessed PTE, concatenating a byte index (BI) field of the NPG requested VA with the obtained PFRA field to generate the GR address of the guest requested data or instructions (GR DATA address), performing any required prefixing and offsetting on the GR DATA address to obtain the offsetted guest absolute address of the guest requested data (GA DATA address),
sequencing the hardware logic circuits to perform a single-level translation on the GA DATA address using host segment and page tables to obtain an absolute address in main storage for a page frame containing guest requested data or instructions,
writing a TLB entry for the NPG requested VA with the main storage absolute address of the guest requested data or instructions,
concatenating the page frame absolute address and a byte index field in the NPG requested VA to generate the address of the guest requested data or instructions.

3. A DAT method as defined in claim 1, further comprising the steps of:
having a TLB miss instead of the TLB hit during the TLB search for the GR STE address,
applying any required guest prefix to the GR STE address to convert it to an absolute address (GA STE address),
adding a guest offset to the GA STE address to generate an offsetted GA STE address to locate the guest STE in main storage.

4. A DAT method as defined in claim 1, further comprising the steps of:
having a TLB miss instead of the TLB hit during the TLB search for the GR PTE address,
applying any required guest prefix to the GR PTE address to convert it to an absolute address (GA PTE address),
adding a guest offset to the GA PTE address to generate an offsetted GA PTE address to locate the guest PTE in main storage.

5. A DAT method as defined in claim 3, further comprising the steps of:
checking if the offsetted GA STE address exceeds a guest memory limit,
generating an exception signal if the checking step finds the guest memory limit is exceeded by the address,
whereby the DAT method is terminated in response to the generating step providing an exception signal.

6. A DAT method as defined in claim 4, further comprising the steps of:
checking if the offsetted GA PTE address exceeds the guest memory limit, generating an exception signal if either checking step finds the guest memory limit is exceeded by the address, whereby the DAT method is terminated in response to the generating step providing an exception signal.

7. A DAT method as defined in claim 1, further comprising the steps of:
  overlapping the searching of the TLB for the GR STE address with the following steps:
    applying a guest prefix to the GR STE address to convert it to an absolute address (GA STE address),
    checking if the GA STE address exceeds a guest memory limit and generating an exception signal if the address exceeds the limit,
    adding a guest offset to the GA STE address to locate the guest STE in main storage.

8. A DAT method as defined in claim 1, further comprising the steps of:
  overlapping the searching of the TLB for the GR PTE address with the following steps:
    applying a guest prefix to the GR PTE address to convert it to an absolute address (GA PTE address),
    checking if the GA PTE address exceeds a guest memory limit and generating an exception signal if the address exceeds the limit,
    adding a guest offset to the GA PTE address to locate the guest PTE in main storage.

9. A DAT method as defined in claims 3 or 5, further comprising the steps of:
  having a TLB miss during the TLB search for the GR STE address,
  translating the GR STE address using a host segment table origin (host STO) to obtain a host page frame real address (PFRA) as the page translation for the GR STE address,
  writing an intermediate TLB entry representing the GR STE address and containing the GR STE PFRA as the GR STE translation.

10. A DAT method as defined in claims 4 or 6, further comprising the steps of:
  having a TLB miss during the TLB search for the GR PTE address,
  translating the GR PTE address using a host segment table origin (host STO) to obtain a host page frame real address (PFRA) as the page translation for the GR PTE address,
  writing an intermediate TLB entry representing the GR PTE address and containing the GR PTE PFRA as the GR PTE translation.

* * * * *